(12) United States Patent
Tironi et al.

(10) Patent No.: US 9,695,895 B2
(45) Date of Patent: Jul. 4, 2017

(54) DISC FOR DISC BRAKES

(75) Inventors: Giovanni Tironi, Bergamo (IT); Simone Biondo, Monza e Brianza (IT); Stefano Medici, Bergamo (IT); Michele Donati, Bergamo (IT)

(73) Assignee: FRENI BREMBO S.p.A., Brembo (IT)

( * ) Notice: Subject to any disclaimer, the term of this patent is extended or adjusted under 35 U.S.C. 154(b) by 243 days.

(21) Appl. No.: 13/981,758

(22) PCT Filed: Jan. 23, 2012

(86) PCT No.: PCT/IB2012/050293
§ 371 (c)(1),
(2), (4) Date: Jan. 13, 2014

(87) PCT Pub. No.: WO2012/101561
PCT Pub. Date: Aug. 2, 2012

(65) Prior Publication Data
US 2014/0151166 A1 Jun. 5, 2014

(30) Foreign Application Priority Data
Jan. 26, 2011 (IT) .............................. MI2011A0090

(51) Int. Cl.
*F16D 65/12* (2006.01)
*F16D 65/02* (2006.01)

(52) U.S. Cl.
CPC ........... *F16D 65/123* (2013.01); *F16D 65/12* (2013.01); *F16D 2065/1316* (2013.01);
(Continued)

(58) Field of Classification Search
CPC ............................... F16D 65/123; F16D 65/12
(Continued)

(56) References Cited

U.S. PATENT DOCUMENTS 3,542,166 A * 11/1970 Harrison ............... F16D 65/123
188/218 XL
3,680,675 A * 8/1972 Livezey .................... 192/107 R
(Continued)

FOREIGN PATENT DOCUMENTS

DE 3823146 1/1990
DE 19650056 6/1998
(Continued)

OTHER PUBLICATIONS

International Search Report, dated Mar. 20, 2012, received in connection with International Application No. PCT/IB2012/050293.
(Continued)

*Primary Examiner* — Thomas J Williams
(74) *Attorney, Agent, or Firm* — Meunier Carlin & Curfman LLC

(57) ABSTRACT

A brake band (2) is in a first material suitable for the braking action and has at least one extension (8) for coupling to a bell (3), suitable for coupling the disc (1) to a hub of a vehicle; said coupling extension being a single piece with said brake band and forming a geometric coupling with said bell to transmit the braking action; said geometric coupling being obtained by fusion preferably of the bell on the brake band, said bell being in a second material, the first and second material having a different melting point; said geometric coupling having, circumferentially spaced, first teeth, that axially extend to be tightly received in first axial seats (11) of the bell; wherein said geometric coupling has circumferentially spaced eighth teeth of the band that radially extend circumferentially offset with respect to said first axial teeth (10) and are suitable for being tightly received in eighth radial seats (13) present in the bell.

20 Claims, 15 Drawing Sheets

(52) U.S. Cl.
CPC ............ *F16D 2065/1344* (2013.01); *F16D 2065/1356* (2013.01); *F16D 2200/003* (2013.01); *F16D 2200/0013* (2013.01); *F16D 2250/0015* (2013.01)

(58) Field of Classification Search
USPC .................................................. 188/218 XL
See application file for complete search history.

(56) References Cited

U.S. PATENT DOCUMENTS

| | | | | |
|---|---|---|---|---|
| 5,005,676 | A * | 4/1991 | Gassiat ................ | 188/218 XL |
| 5,437,351 | A * | 8/1995 | Lindner ................ | F16D 55/28 188/171 |
| 6,152,270 | A * | 11/2000 | Giorgetti ............... | 188/218 XL |
| 7,861,832 | B2 | 1/2011 | Kleber | |
| 9,316,276 | B2 * | 4/2016 | Kleber ................. | F16D 65/123 |
| 2006/0151266 | A1 * | 7/2006 | Sadanowicz .......... | 188/218 XL |
| 2006/0213732 | A1 * | 9/2006 | Leevy et al. .......... | 188/218 XL |
| 2007/0119667 | A1 * | 5/2007 | Hanna et al. ......... | 188/218 XL |
| 2007/0199778 | A1 * | 8/2007 | Lee ....................... | 188/218 XL |
| 2007/0246314 | A1 * | 10/2007 | Schorn et al. ........ | 188/218 XL |
| 2008/0041674 | A1 * | 2/2008 | Walker et al. ........ | 188/218 XL |
| 2010/0025169 | A1 * | 2/2010 | Becker ................. | 188/218 XL |
| 2010/0065388 | A1 * | 3/2010 | Kleber .................. | 188/218 XL |
| 2010/0258394 | A1 * | 10/2010 | Hanna et al. ......... | 188/264 A |
| 2011/0290602 | A1 * | 12/2011 | Kleber et al. ......... | 188/218 XL |
| 2012/0168266 | A1 * | 7/2012 | Veneziano et al. .... | 188/218 XL |
| 2013/0037359 | A1 * | 2/2013 | Kim et al. ............. | 188/218 XL |

FOREIGN PATENT DOCUMENTS

| | | | |
|---|---|---|---|
| EP | 1092889 | 4/2001 | |
| EP | 1128084 | 8/2001 | |
| EP | 1426644 | 6/2004 | |
| EP | 1426644 A2 * | 6/2004 | |
| ES | 8202409 | 4/1982 | |
| GB | 2107012 | 4/1983 | |
| WO | 2006/046258 | 5/2006 | |
| WO | WO 2009137101 A2 * | 11/2009 | ............ F16D 65/12 |

OTHER PUBLICATIONS

International Preliminary Report on Patentability and Written Opinion, dated Jul. 30, 2013, received in connection with International Application No. PCT/IB2012/050293.

* cited by examiner

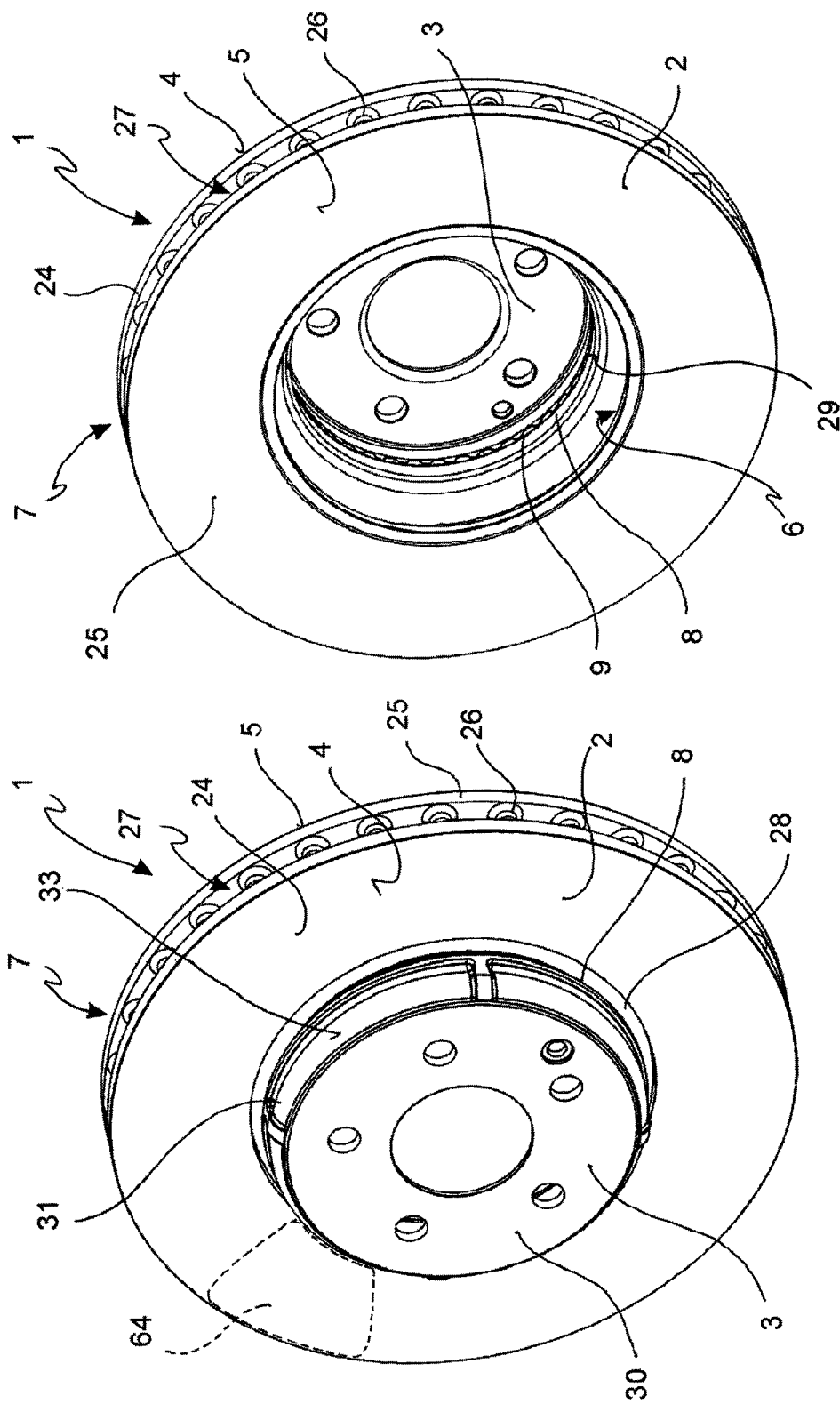

DISC FOR DISC BRAKES

The present invention relates to a disc for disc brake, particularly, but not exclusively, for applications in the automotive field.

In particular, the present invention also relates to a brake band for a disc of a disc brake, to a bell for a disc of a disc brake, as well as a method for obtaining a brake band, a method for making a disc for a disc brake and apparatuses for producing a disc for a disc brake.

As it is known, discs for disc brake are composed of two parts sharing a rotation axis. A first part, the support bell, is intended to be connected with a wheel hub of a vehicle, while the remaining peripheral part, the brake band, is intended to co-operate with a caliper of a disc brake that, arranged astride on said brake band, exerts a braking action on the vehicle. The brake band can be of a solid type or, as in the examples represented in the attached figures, of a ventilated type. The ventilated band comprises two strips mutually connected by means of a plurality of bridges or connection elements, so as to define circulation channels for the cooling air.

With reference to the disc and the rotation axis thereof, by axial is meant any direction parallel to said rotation axis, by radial is meant any direction perpendicular to the rotation axis and incident therewith, and by tangential or circumferential is meant any direction tangential to a circumference centred on said rotation axis and lying on a plane that is perpendicular to said axis or a circumferential direction coinciding with said circumference.

It is also known that, during the actuation of the brake, the friction between the pads of the brake calipers and the surface of the braking bands generates a high amount of heat that needs to be dissipated. The generated heat causes the onset of a number of undesired phenomena, first of all the overheating of the components and the consequent dilatation and thermal deformation thereof.

With regard to disc brakes, the need to produce the brake band with a material that, besides ensuring the desired friction characteristics, is able to maintain its mechanical characteristics as much unaltered as possible when the operative temperature increases is particularly felt. With a view to this, it is particularly suitable to make, for example, the brake band in cast iron.

Similarly, the need to produce the support bell with a material that is as lightweight as possible to reduce the mass of the disc, to begin with, and consequently the unsuspended masses of the vehicle is particularly felt. With a view to this, it is particularly suitable to make the support bell in a light alloy, for example, in aluminium alloy.

With reference to the discs of the prior art, it is noted that the deformations due to the thermal stresses involve operation drawbacks of the disc brake, first of all the uneven wear of the pads of the brake calipers. This is mainly due to the fact that, unlike the brake band, which tends to deform radially while remaining coplanar with itself, the support bell deforms while taking a cone configuration that determines also the warping of the brake band, i.e., the deformation of the brake band outside the plane where it initially lay. In essence, the support bell deformation determines the warping, and therefore the loss of co-planarity of the brake band.

From what has been stated before, it is apparent the double need to maintain the transmission of the braking torque from the brake band to the support bell unaltered, while allowing to the brake band to radially dilate due to the thermal stresses to which it is subject, in a manner that is as much independent as possible from support bell.

Patent EP 1092889, in the name of the same Applicant, discloses a disc in which the bell in aluminium alloy and the brake band in cast iron are mutually connected by a plurality of stainless steel pins. These pins, coupled with in the brake band and loose in the bell, ensure for the band the possibility to radially dilate.

This solution is particularly advantageous from many points of view, however, it is particularly expensive and complex from a constructive point of view. Furthermore, the reduced section of the steel pins causes apparent strain peaks in the material during the transmission phase of the braking torque from the band to the bell.

It is also known from the U.S. Pat. No. 6,152,270, in the name of the same Applicant, a disc having a brake band in cast iron and a support bell in light alloy. The two pieces produced by successive fusions are produced so as to adhere to be mutually coupled. This solution, while being inexpensive and easy to carry out, does not ensure a constant coupling between the brake band and the bell, also under a condition of strong thermal ranges.

From the document EP 1426644, it is known to make a disc for a disc brake having a brake band in a first material and a bell made from a second material. This document shows different solutions that allow coupling the bell to the brake band by means of a plastic deformation of the material of the bell on a coupling portion of the band or, alternatively, melting the bell around protuberances of the band.

Neither this known solution, while being satisfactory from many points of view, allows obtaining a coupling between band and bell that ensures the transmission of the torque from the band to the hub during high and repeated thermal ranges, both due to the geometry of the proposed geometric coupling between band and bell, and due to the conical deformation of the bell, which further deteriorates the geometric coupling between bell and band.

From the document DE 3823146, it is known to make a braking disc in two parts, a brake band and a bell, which are mutually connected by a geometric coupling portion welded by soldering. Neither this solution, while being satisfactory from many points of view, has geometry of the geometric coupling between the brake band and the bell that allows ensuring a safe transfer of the torque from the band to the hub, also under heavy braking conditions and during high and repeated thermal ranges. Furthermore, in this solution, no measure to reduce the conical deformation of the bell is proposed, which further aggravates the limits of the proposed geometric coupling.

The document ES 8202409, by the same Applicant, proposes a solution of a disc for a disc brake composed by two components, a brake band and a bell, where the bell is melted after making the brake band on an appendix of the brake band that projects axially, thus making an undercut portion both in the circumferential direction and in the axial direction. Again, such a solution, while being satisfactory from many points of view, has not a geometry of the geometric coupling between brake band and bell on this melting operation that allows a constant and durable transmission of the torque, also under heavy repeated braking actions.

The document US 2007119667 also shows a disc obtained by successive fusion of a bell on a pre-made brake band, as well as the document U.S. Pat. No. 6,152,270, by the same Applicant. In these solutions, the bell has a coupling end at the band that is radially collapsed so as to receive a radial toothing of the brake band.

Also the solution GB 2107012 shows a similar solution, where the brake band is drowned with a radial toothing thereof within the bell body.

A solution that is similar to those described above is given in the document U.S. Pat. No. 7,861,832. Other solutions are described in the documents WO 2006/046258 and EP 1128084.

All these solutions, while being satisfactory from many points of view, do not allow having a good cohesion between the material of the bell and the material of the band, which cohesion remains unaltered during the repeated and heavy braking actions that are typical, for example, of a vehicle, for example of a sports type, or a commercial vehicle, thus limiting the ability to transfer the braking torque from the band to the hub and sometimes involving the arrangement of small slacks in the coupling between the brake band and the bell.

Therefore, it is the object of the present invention to devise a disc for a disc brake, which has such structural and functional characteristics as to meet the above-mentioned needs, while obviating the drawback reported with reference to the prior art.

Such a problem is solved by a brake band for a disc of a disc brake in accordance with claim 1, as well as by a bell for a disc of a disc brake according to claim 7, a disc for a disc brake according to claim 10, a method for making a disc for a disc brake according to claim 12, and an apparatus for producing a brake band according to claim 14.

Further characteristics and advantages of the disc for disc brake according to the invention will become understood from the description reported below of preferred implementation examples thereof, given by way of indication, and not limitation, with reference to the annexed figures, in which:

FIG. 1 represents in perspective view a disc for disc brake from the wheel side;

FIG. 2 represents in perspective view the disc of FIG. 1 from the vehicle side;

Figure 4:
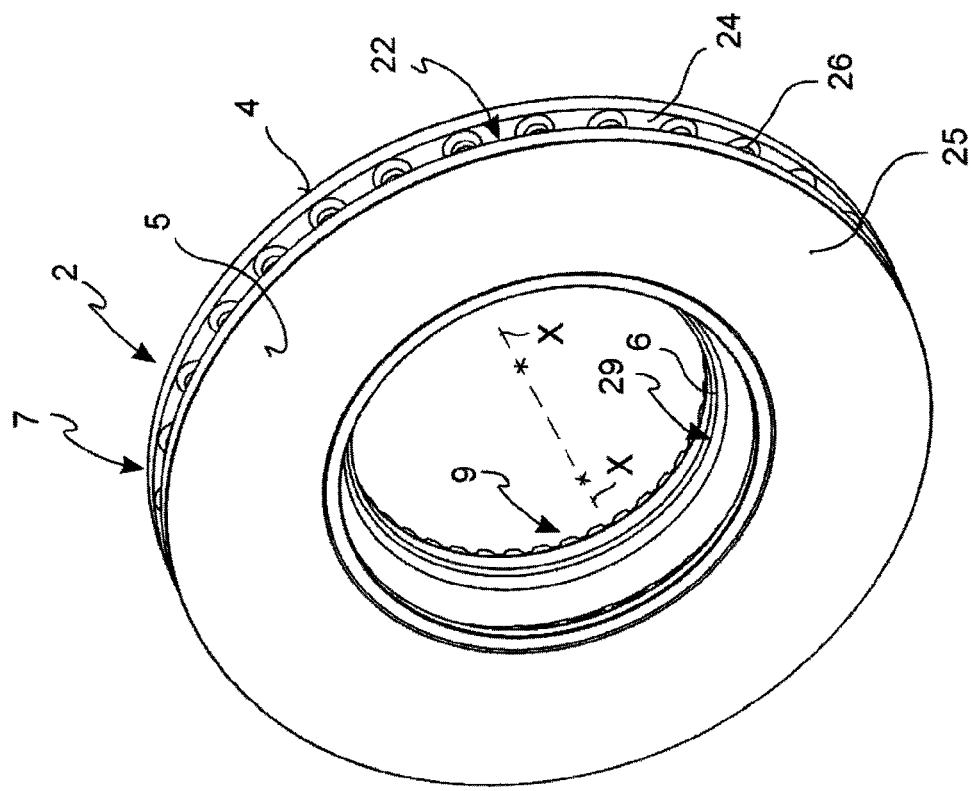
FIG. 4 represents in perspective view the brake band of FIG. 3 from the vehicle side.
Figure 3:
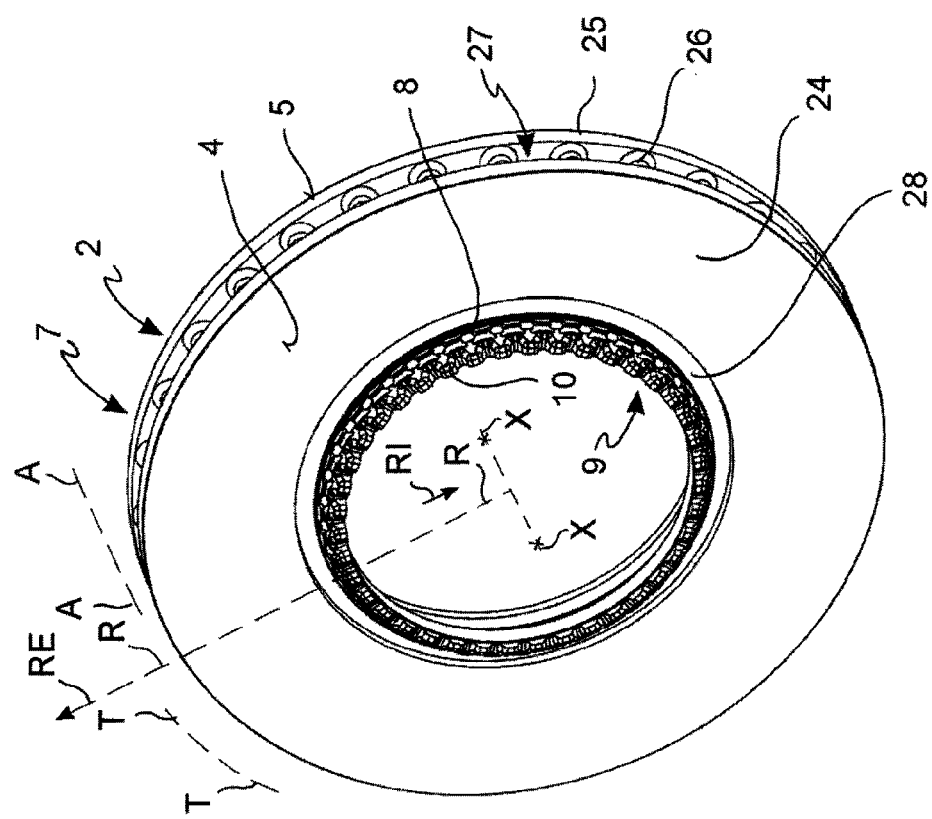
FIG. 3 illustrates in perspective view a brake band from the wheel side.
Figure 5:
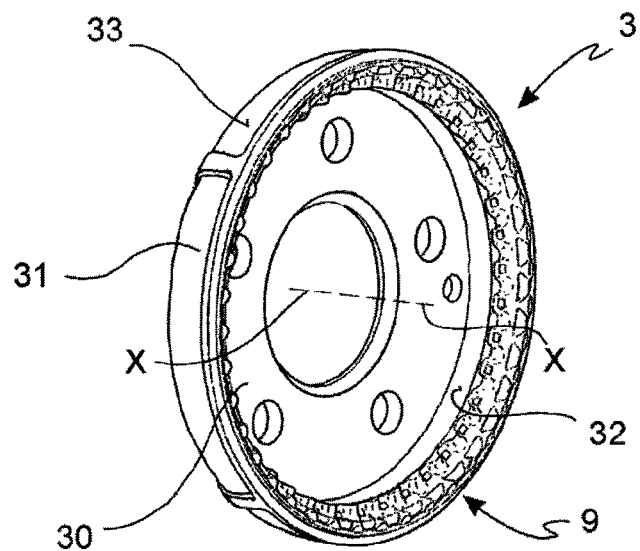
FIG. 5 represents in perspective view a disc bell for disc brake from the vehicle side.
Figure 6:
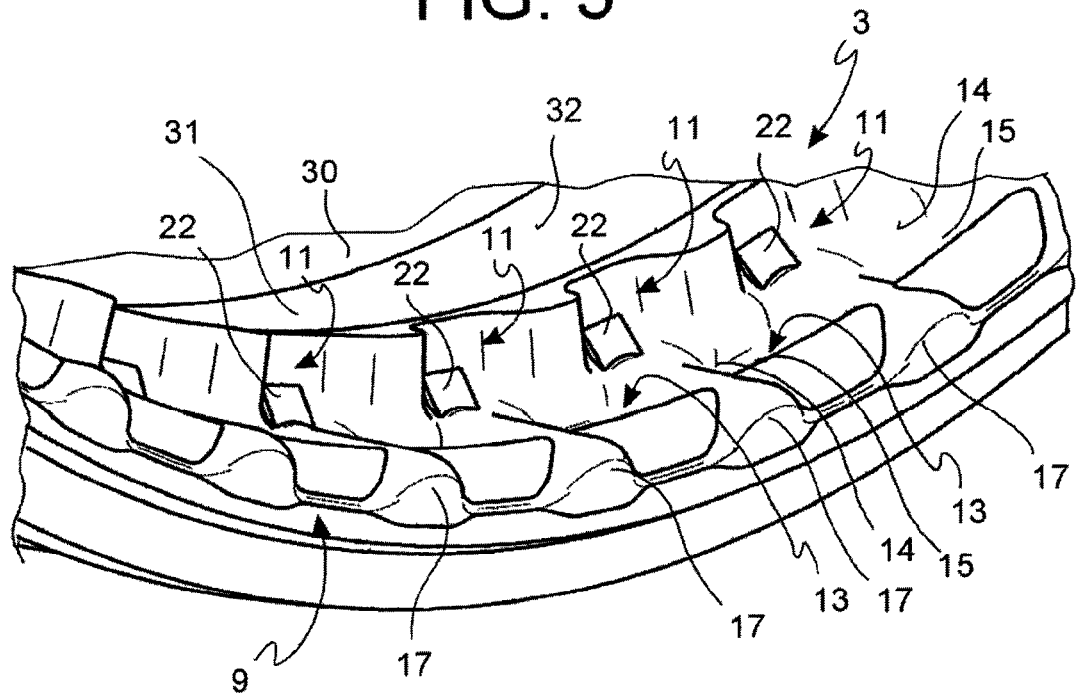
FIG. 6 represents in perspective view a detail of the coupling portion of a bell from the vehicle side.
Figure 7:
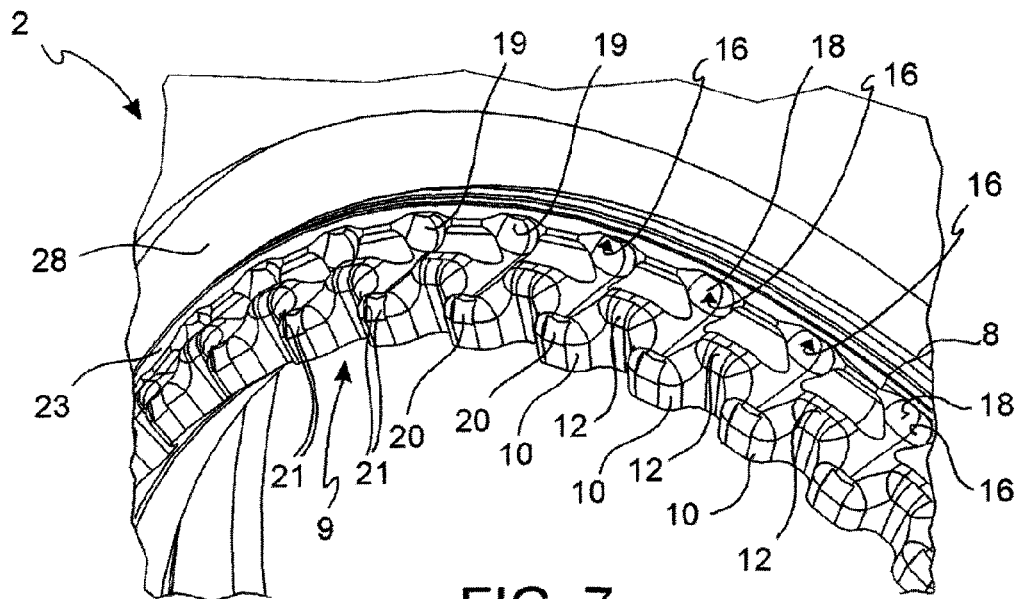
FIG. 7 represents in perspective view a detail of a brake band from the wheel side.
Figures 8, 9:
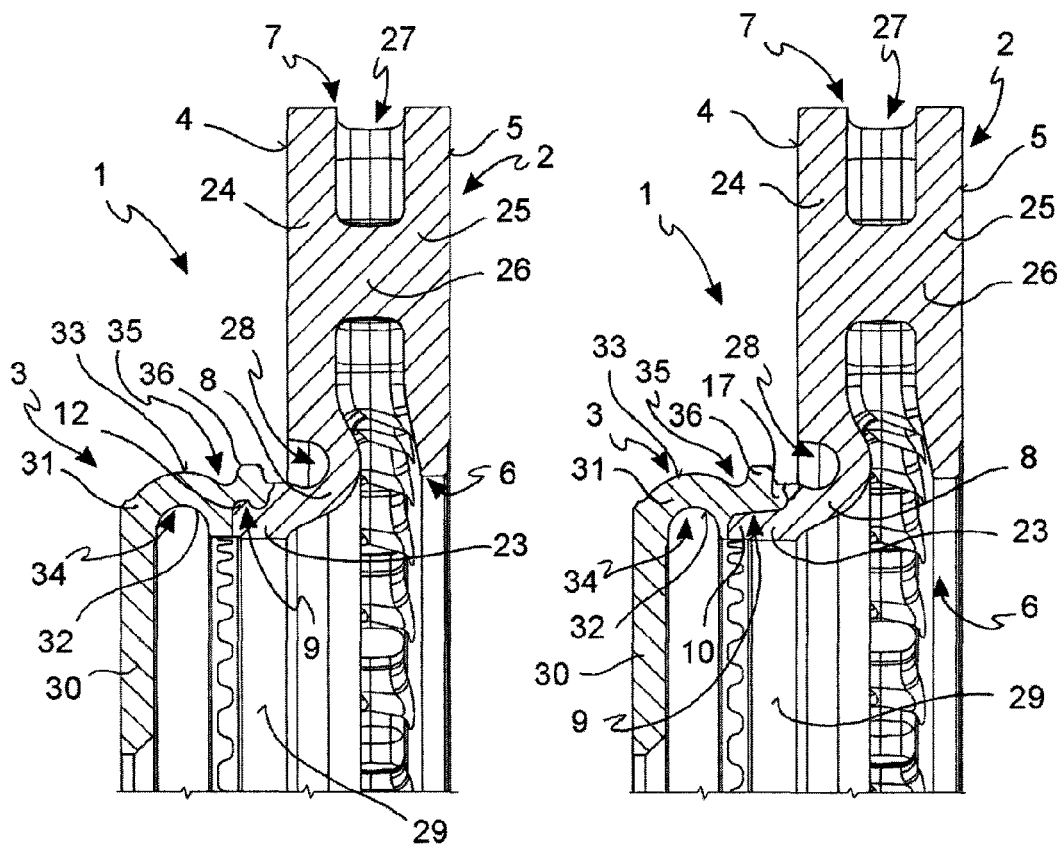
FIG. 8 represents a detail of a section obtained with a radial plane on a disc for disc brake according to FIG. 1.
FIG. 9 represents a detail of a section according to a radial plane circumferentially rotated with respect to the plane of section of FIG. 8.
Figure 10:
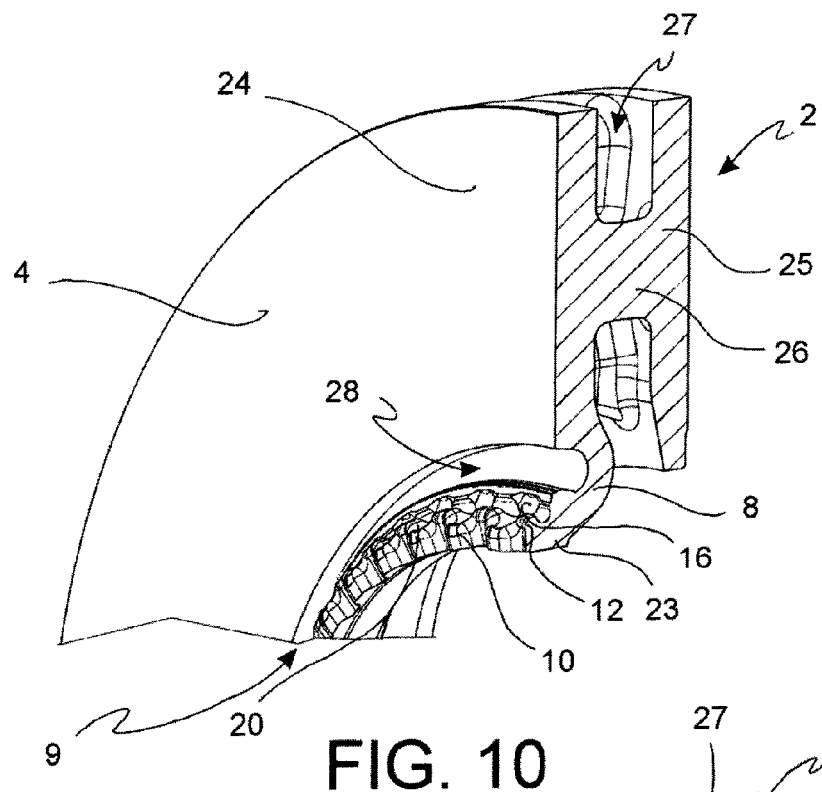
FIG. 10 represents a detail of a perspective view, partially in section, of a brake band, in which the section is obtained according to a first radial plane.
Figure 11:
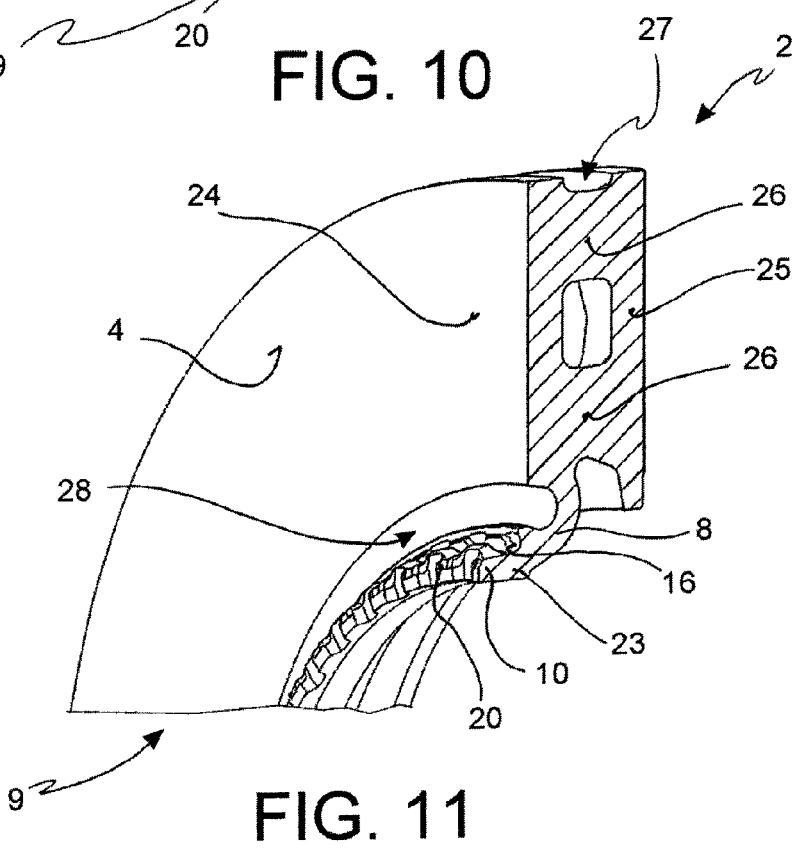
FIG. 11 illustrates a detail of a perspective view of a brake band, partially in section according to a radial plane circumferentially rotated with respect to the radial plane of the section of FIG. 10.
Figures 12, 13:
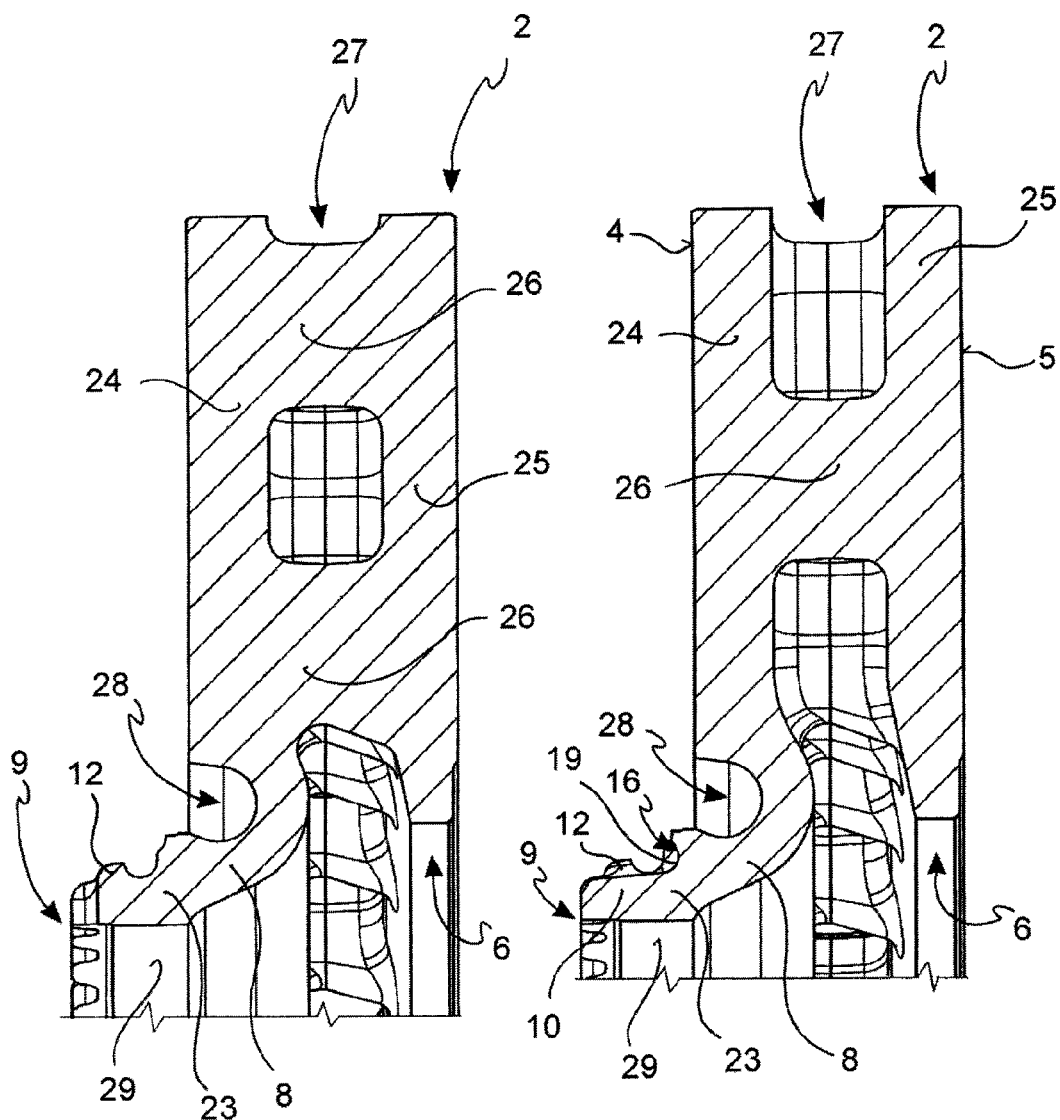
FIG. 12 represents a detail of a section according to the radial plane of section of the brake band of FIG. 10.
FIG. 13 illustrates a detail of a section according to the radial plane of FIG. 11 of the brake band of FIG. 11.
Figure 14:
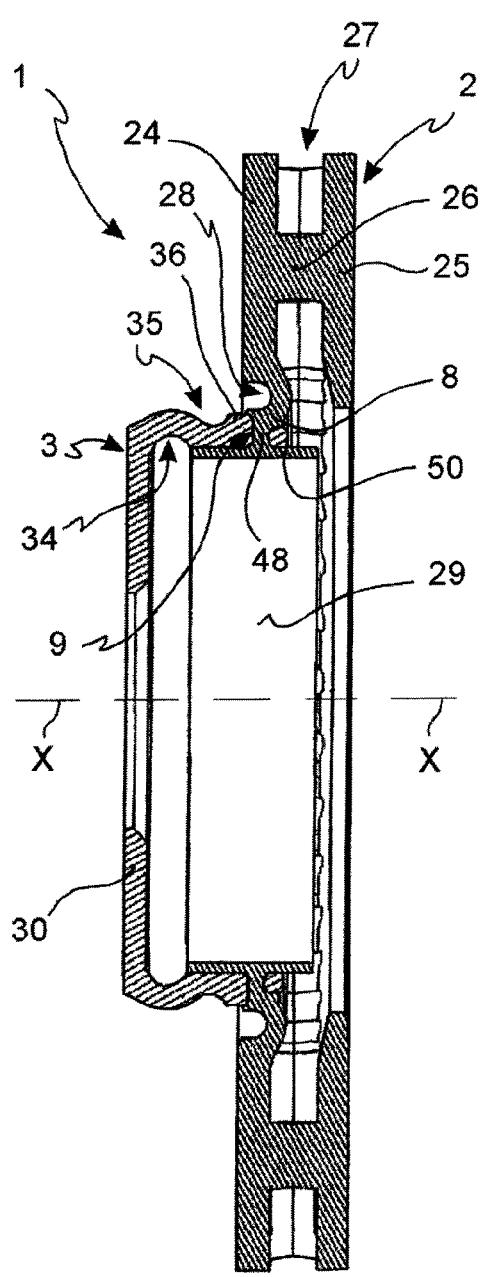
FIG. 14 represents a section according to a radial plane of a disc for disc brake according to a further embodiment.
Figure 15:
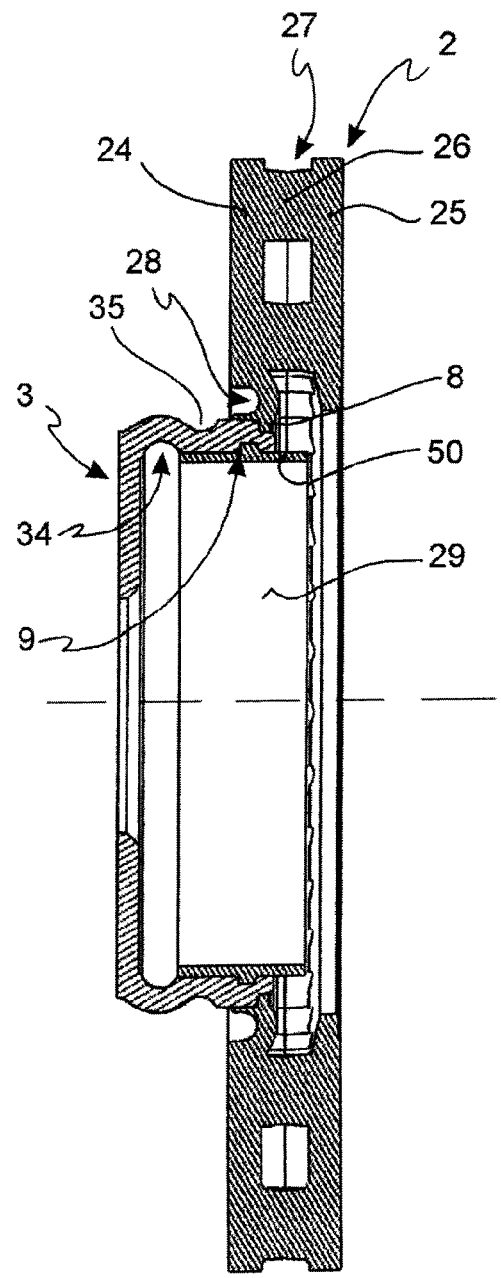
FIG. 15 represents a section according to a radial plane circumferentially rotated with respect to the plane of section of the FIG. 14 of the disc of FIG. 14.
Figures 16, 17:
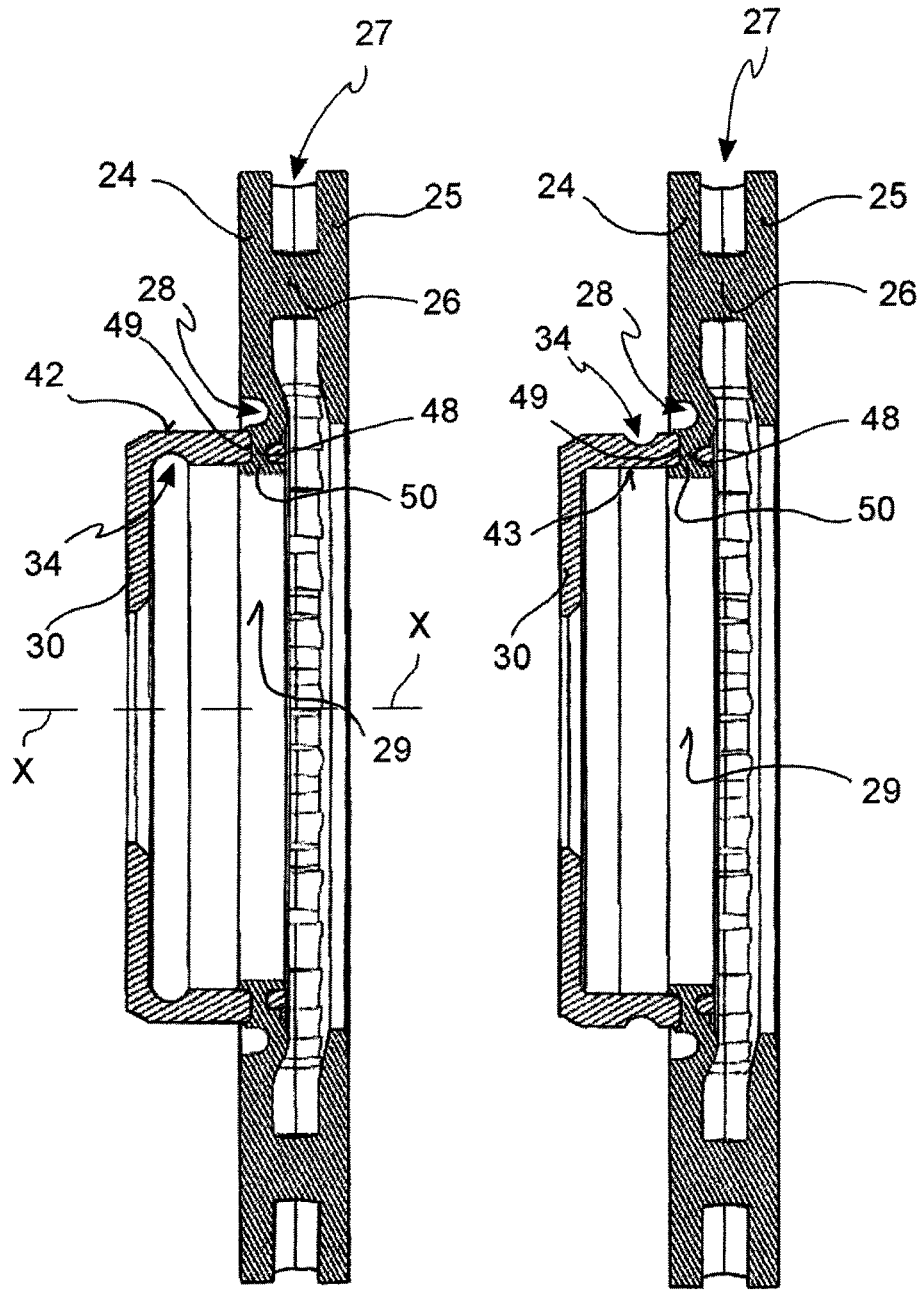
FIG. 16 illustrates a section according to a radial plane of a disc for disc brake according to a still further embodiment.
FIG. 17 represents a section according to a radial plane circumferentially rotated with respect to the radial plane of section of FIG. 16 of the disc of FIG. 16.
Figures 18, 19:
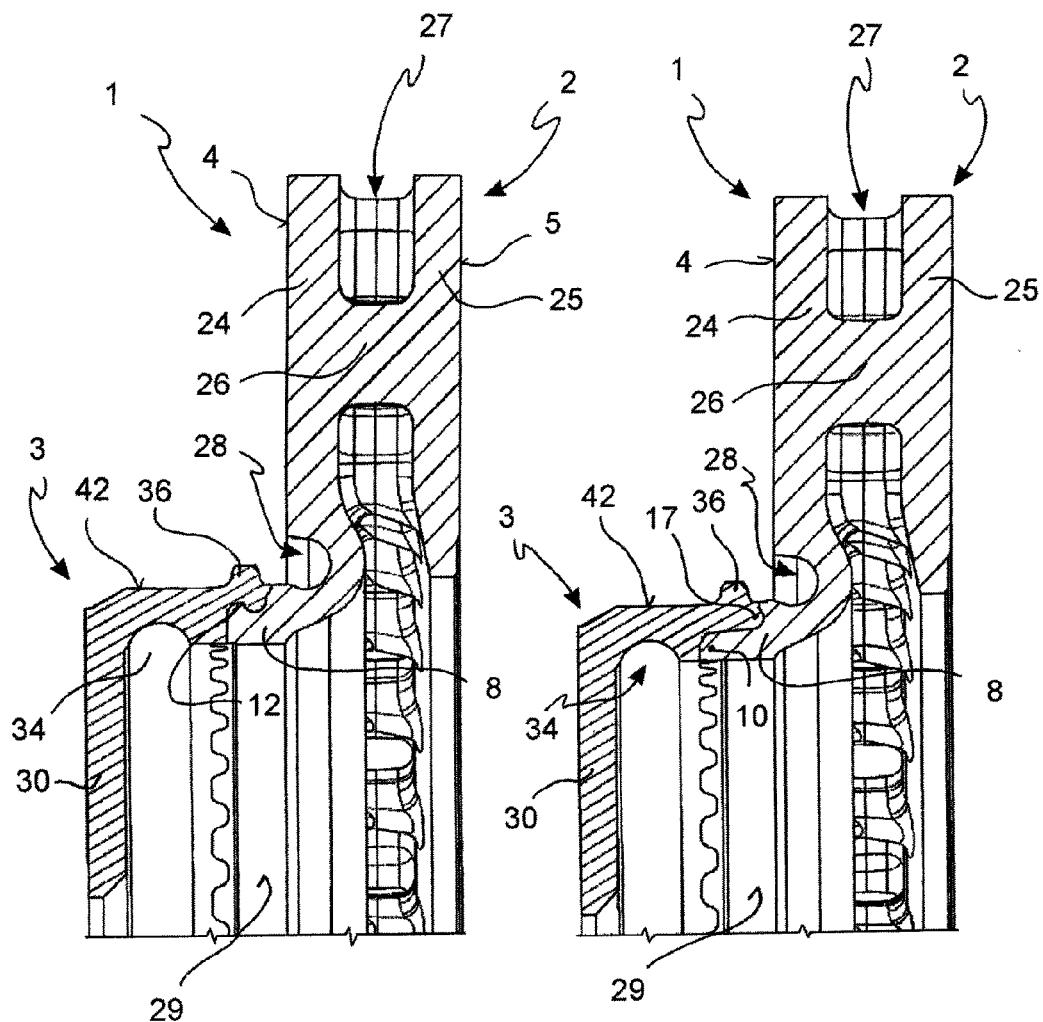
FIG. 18 represents a detail of a section obtained with a radial plane of un disc according to a further embodiment.
FIG. 19 represents a detail of a section according to a radial plane circumferentially rotated with respect to the radial plane of FIG. 18 of the disc of FIG. 18.
Figure 21:
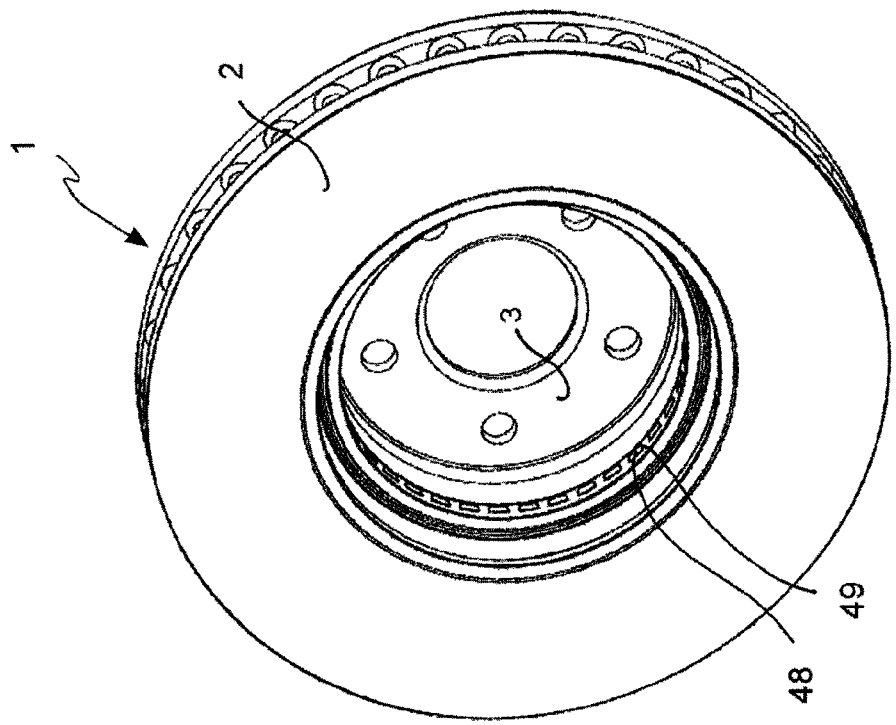
FIG. 21 represents in perspective view according to the vehicle side the disc for disc brake of FIG. 20.
Figure 20:
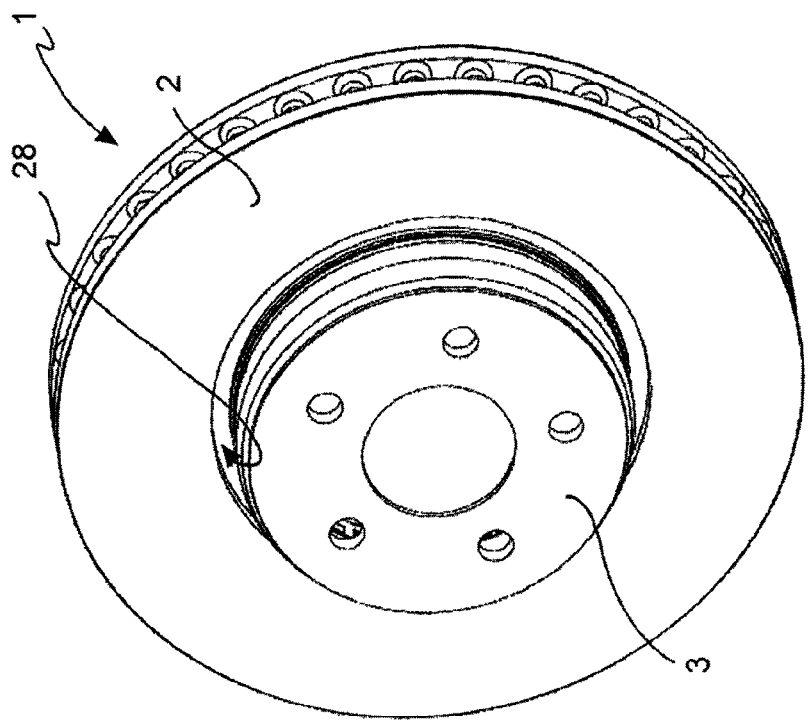
FIG. 20 represents in perspective view from the wheel side a disc for disc brake according to a still further embodiment.
Figure 23:
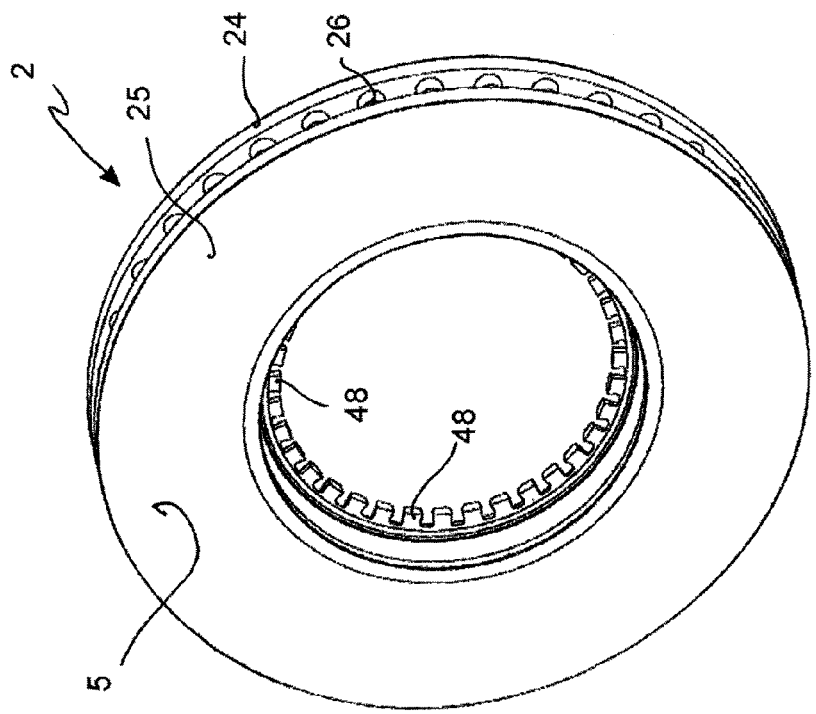
FIG. 23 represents a perspective view from the vehicle side of the brake band of FIG. 22.
Figure 22:
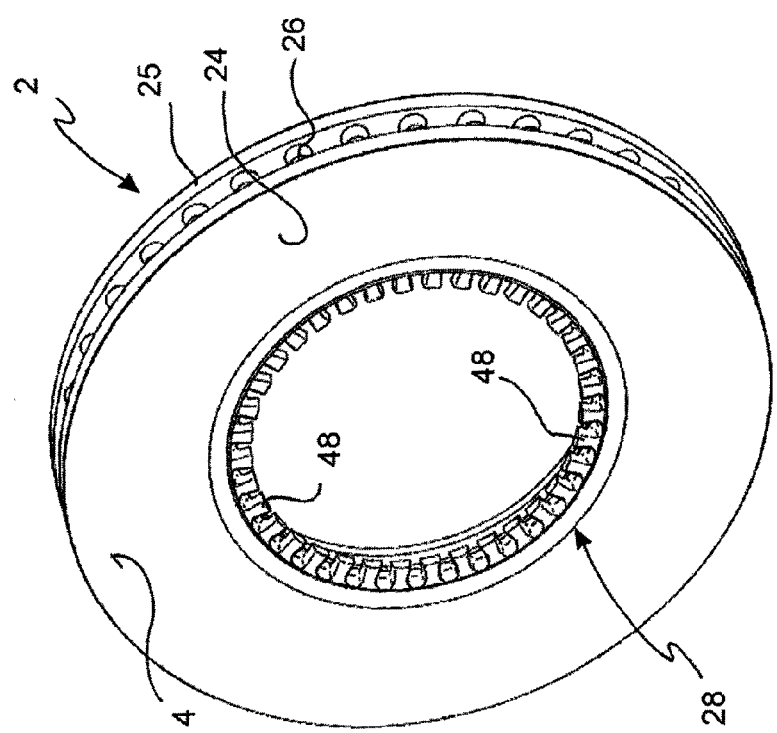
FIG. 22 represents in perspective view a brake band of a disc according to FIG. 20 from the wheel side.
Figure 24:
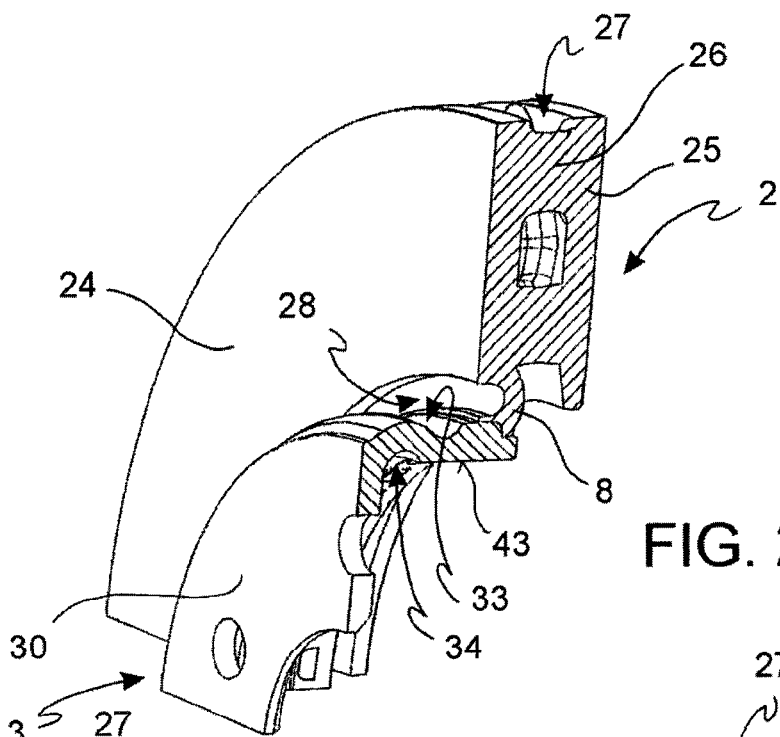
FIG. 24 represents in perspective view, partially in section, a detail of the disc for disc brake according to FIG. 20.
Figures 25, 26:
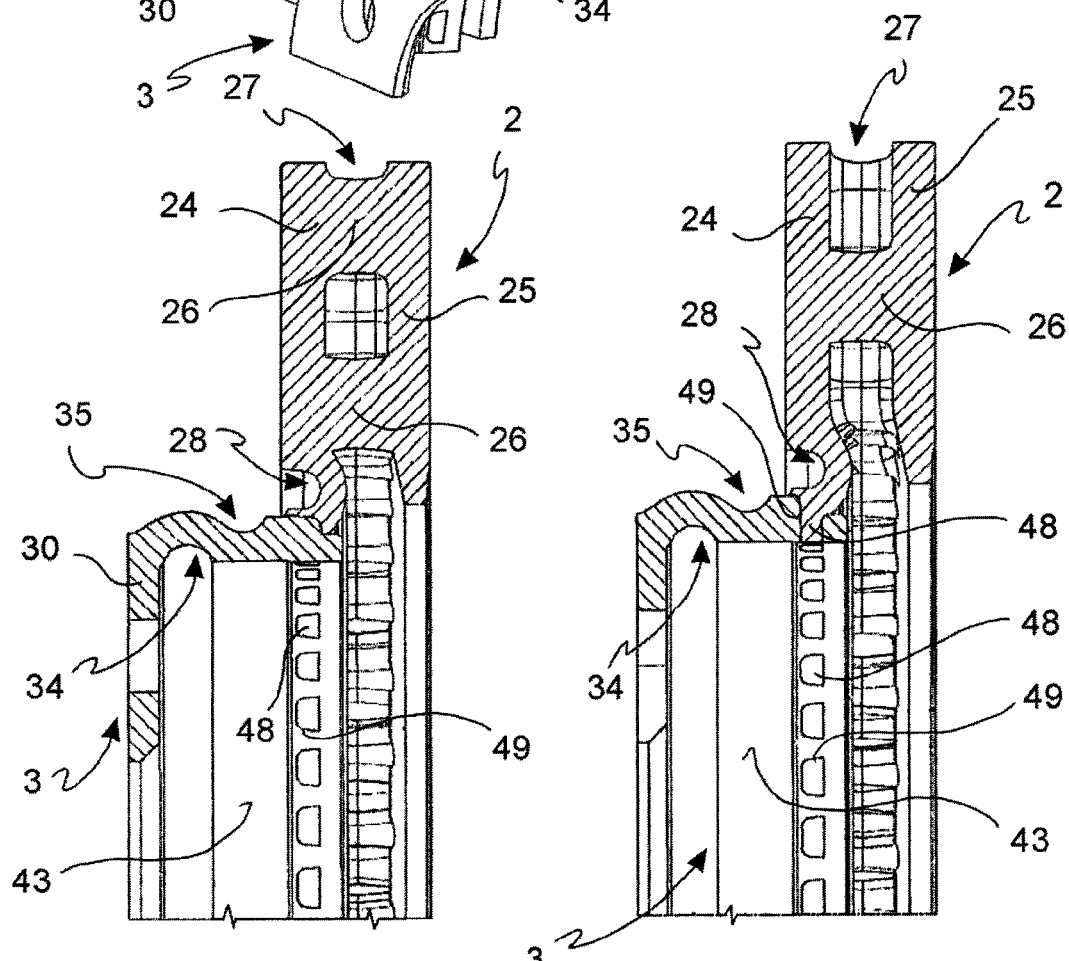
FIG. 25 represents a section according to a radial plane of the disc of FIG. 20.
FIG. 26 represents a detail of a section according to a radial plane circumferentially rotated with respect to the radial plane of section of FIG. 25 of the disc of FIG. 20.
Figure 28:
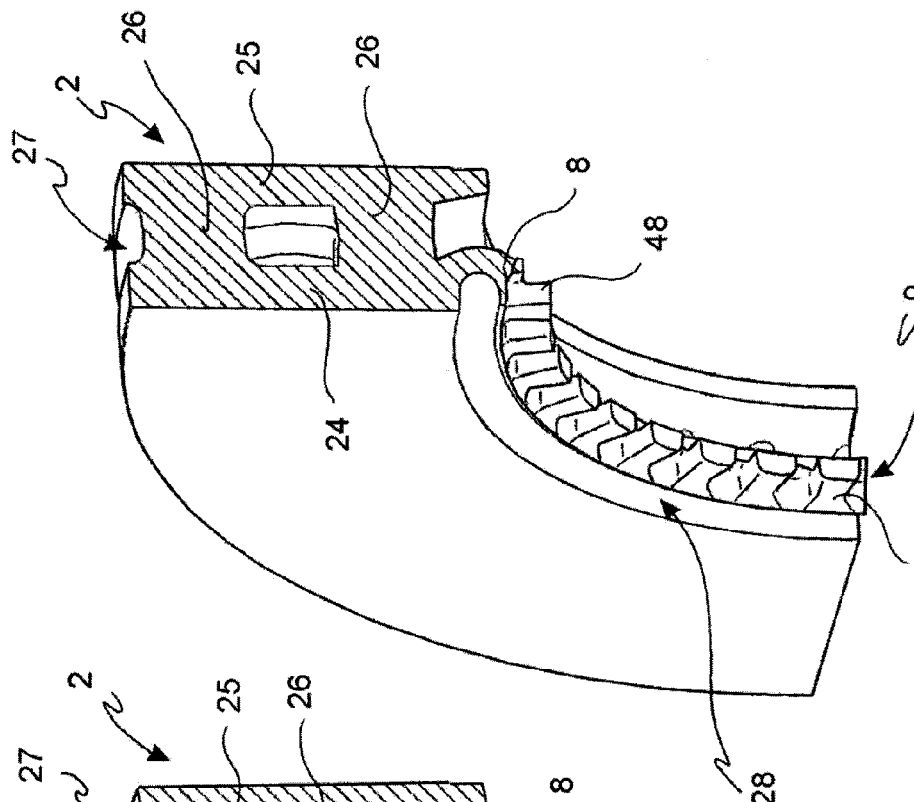
FIG. 28 represents in axonometric view a sectioned detail according to a radial plane circumferentially rotated with respect to the radial plane of section of FIG. 27 of a brake band according to FIG. 22.
Figure 27:
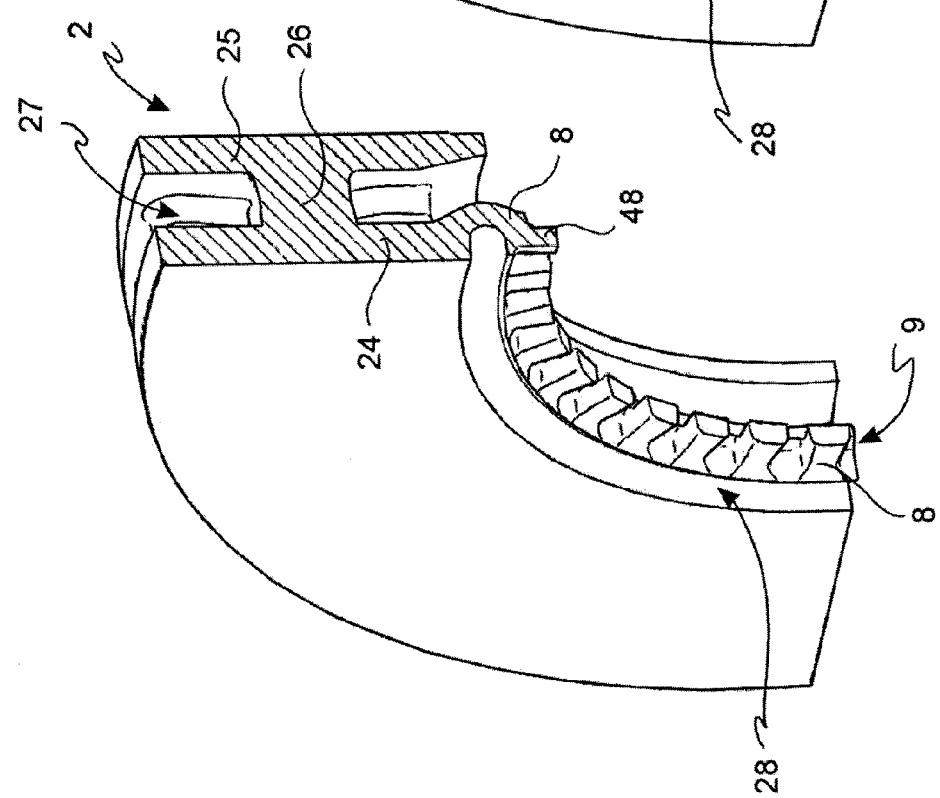
FIG. 27 represents in axonometric view a sectioned detail according to a radial plane of the brake band according to FIG. 22.
Figure 29:
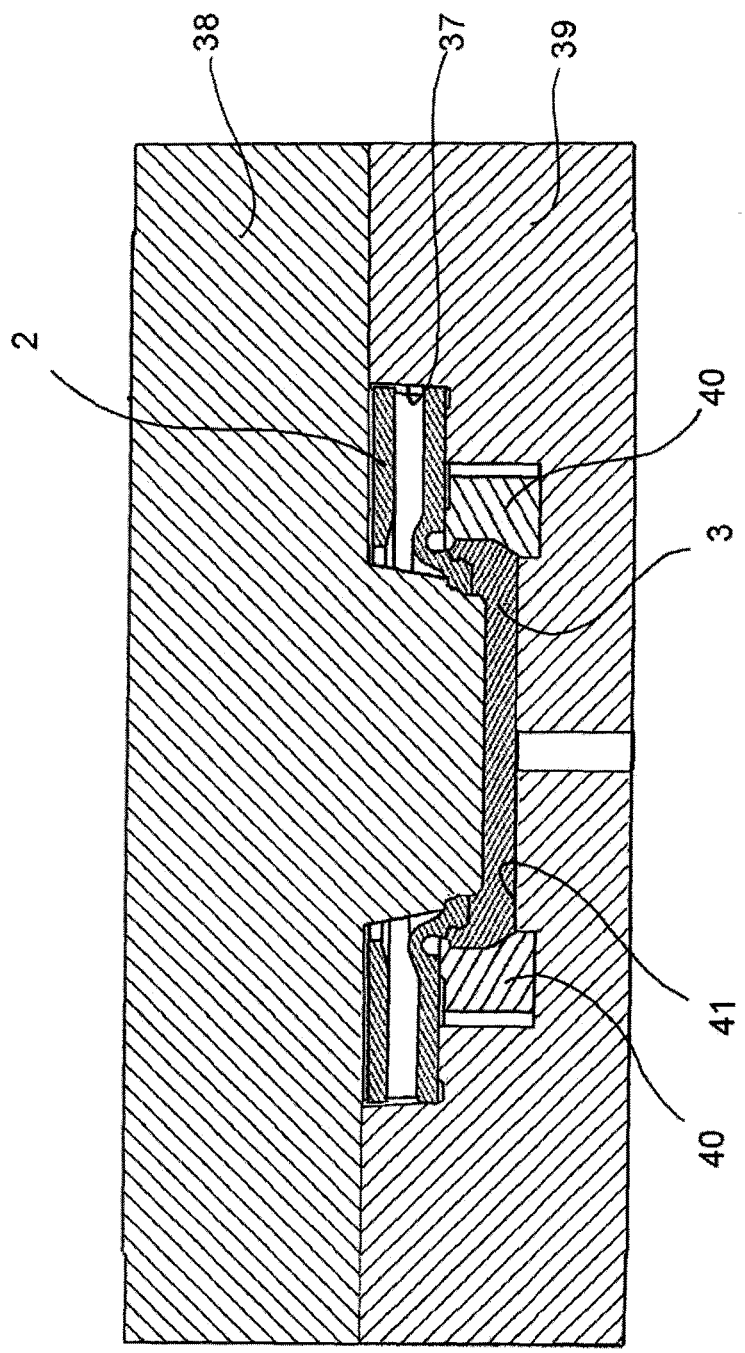
FIG. 29 represents a mould for the manufacture of a disc for disc brake according to a first embodiment.
Figure 30:
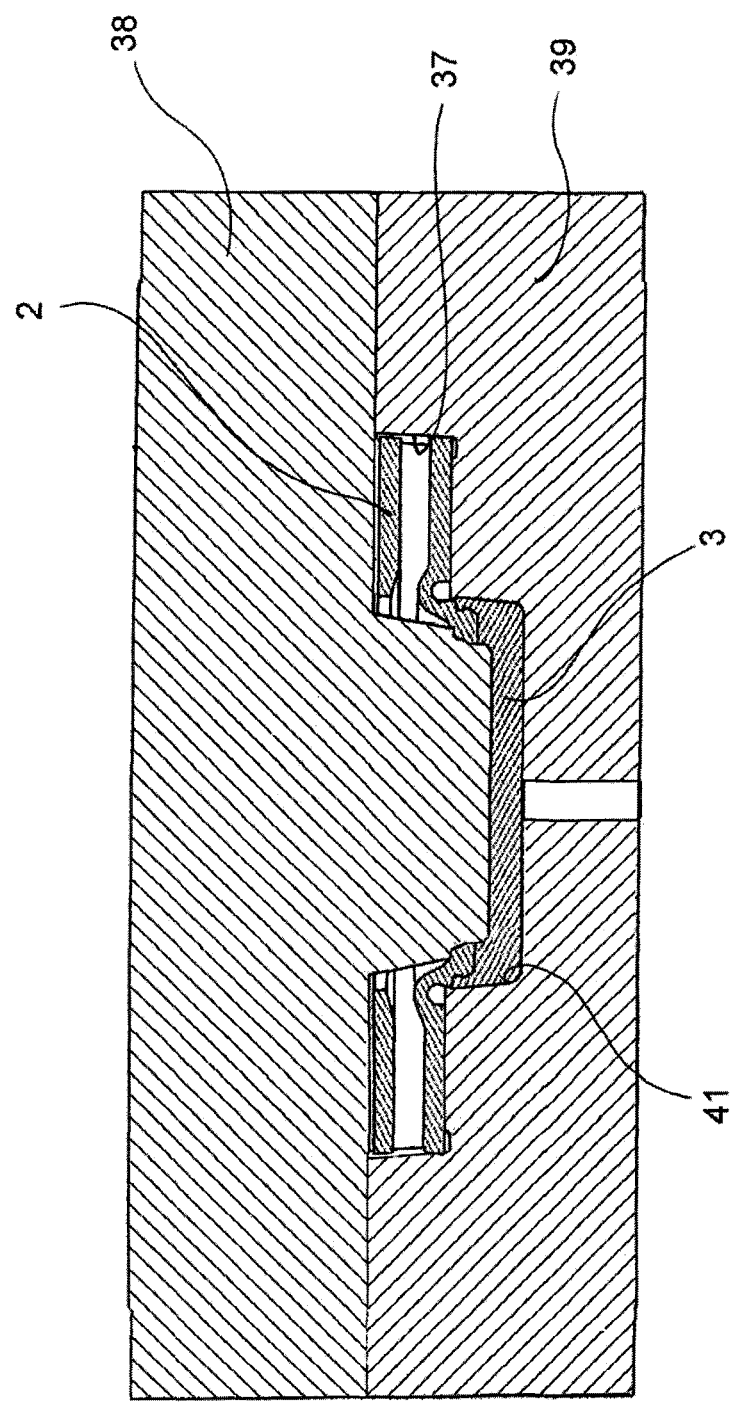
FIG. 30 represents a mould for the manufacture of a disc for disc brake according to a further embodiment.

With reference to the above-mentioned figures, a disc for disc brake according to the invention and intended to be used in a disc brake of a vehicle, for example, an automobile or a commercial vehicle, is generally indicated with 1.

The disc 1 has a conformation substantially circular that extends around a symmetry axis thereof, indicated with X-X, as well as a rotation axis.

The disc 1 comprises a support bell 3 and a brake band 2 co-axial to the support bell 3.

In accordance with an embodiment, said disc 1 has one, or preferably two, strips 24, 25 having two opposite braking surfaces 4, 5 suitable for cooperating with pads 64 of a brake caliper arranged astride of said brake band 2.

Said disc for disc brake 1, said brake band 2, and said bell 3 have an axial direction A-A coinciding with or parallel to said rotation axis X-X, a radial direction R-R that defines a radial outer direction RE when going away from said rotation axis X-X, as well as a radial inner direction RI when approaching said rotation axis X-X. Said components further define a circumferential direction T-T exactly perpendicular to said axial direction A-A and to said radial direction R-R.

In accordance with an embodiment, said brake band 2 has a radially inner edge 6 facing said rotation axis X-X, and a radially outer edge 7 facing away from said rotation axis X-X.

In accordance with an embodiment, said brake band 2 is made in a first material suitable to the braking action exerted by the pads 64 on the braking surfaces 4, 5.

For example, but not necessarily, said brake band is made in cast iron, preferably, but not necessarily, a grey cast iron, or alternatively in titanium, or steel, preferably, but not necessarily, in stainless steel.

In accordance with an embodiment, said brake band 2 is produced by fusion. Preferably, said brake band 2 in the opposite braking surfaces 4, 5 thereof is machined, for example but not necessarily, with a tool machine, so as to have a pre-defined flatness of the braking surfaces 4, 5 and parallelism between the two braking surfaces 4 and 5.

In accordance with an embodiment, said brake band 2 has at least one extension 8 for coupling with the bell 3. In accordance with an embodiment, during the productive process of the brake band 2, said coupling extension 8 is not machined so as to maintain a surface roughness that is typical, for example, of the fusion manufacture.

In accordance with an embodiment, the bell 3 is suitable for coupling the disc 1 with a hub of a vehicle, by means, for example, of an attachment flange thereof that is arranged substantially transversally to said rotation axis X-X and indicated in the figures with the reference 30.

In accordance with an embodiment, said coupling extension 8 of the brake band 2 to the bell 3 is made integral or in a single piece with said brake band, for example, but not necessarily, in a single piece with a strip of the brake band 2, for example, but not necessarily, the strip facing the wheel of the vehicle.

In accordance with an embodiment, said coupling extension 8 of the brake band 2 forms a geometric coupling 9 with said bell 3 to transmit a braking action from the brake band 2 to the bell 3. In accordance with an embodiment, said geometric coupling 9 has a predefined geometric coupling profile.

In accordance with an embodiment, during the manufacturing process of the brake band, all the surfaces of the geometric coupling 9 of the brake band are produced while avoiding machining operations, so as to have surfaces of the geometric coupling 9 having a roughness substantially obtainable by means of, for example, the fusion process.

In accordance with an embodiment, the coupling of said bell 3 and said brake band 2 occurs by fusion, preferably, but not necessarily, foreseeing the bell 3 arranged on the geometric coupling 9 of the brake band 2, for example with the bell on top of the radially outer brake band, avoiding the use of another connecting component between band 2 and bell 3. In accordance with an embodiment, in order to obtain the fusion of the bell on the brake band, said bell 3 is made from a second material different from said first material of the band 2. Preferably, but not necessarily, said second material of the bell 3 has a different melting point with respect to the melting point of the material of the brake band 2. Preferably, but not necessarily, said melting point of the material of the bell 3 is lower, for example, but not necessarily, also substantially lower, with respect to the melting point of the material of the brake band 2.

In accordance with an embodiment, said bell 3 is made in aluminium or, alternatively, in aluminium alloys, or in magnesium or alloys thereof.

In accordance with an embodiment, said geometric coupling 9 has circumferentially spaced first teeth or toothing 10 of the band 2 that extend axially to be tightly received in first axial seats 11 of the bell 3.

In accordance with an embodiment, said geometric coupling 9 has, circumferentially spaced, eighth teeth, or toothing 12, of the brake band 2, which toothing extends radially and being circumferentially offset with respect to said first axial teeth 10, and extends substantially radially so as to be tightly received in eighth radial seats 13 present in the bell 3 and shaped like a pocket with a wall 14 that surrounds said pocket extending substantially radially, and a blind bottom 15.

In accordance with an embodiment, said eighth radial toothing 12 is axially offset with respect to said first axial toothing 10.

In accordance with an embodiment, said geometric coupling 9 has a second axial toothing having, circumferentially spaced, second seats 16 in the brake band shaped like a pocket with walls 18 that surround said seat 16 extending axially, and a blind bottom 19.

In accordance with an embodiment, said second axial band seats 16 are circumferentially aligned with said first axial band teeth 10.

In accordance with an embodiment, said second axial band seats 16 are radially offset with respect to said first axial band teeth 10.

In accordance with an embodiment, said second axial band seats 16 are circumferentially offset with respect to said eighth radial band toothing 12.

In accordance with an embodiment, said geometric coupling 9 has a ninth toothing having, circumferentially spaced, ninth seats 20 in the brake band 2 having abutment walls 21 according to planes that are substantially parallel and opposite in the direction substantially parallel to the radial direction R-R and suitable for transmitting circumferential actions between the brake band 2 and the bell 3 and suitable for tightly receiving teeth 22 of the bell. In accordance with an embodiment, said abutment walls 21 of said ninth seats 20 are obtained by means of chip removal machining, so as to ensure the flatness of said abutment walls 21 and, optionally but not necessarily, the parallelism thereof. Alternatively, said abutment walls 21 are made according to radial planes.

In accordance with an embodiment, said ninth seats 20 are arranged circumferentially aligned with said first axial band teeth 10.

In accordance with an embodiment, said ninth seats 20 are made in said first axial band teeth 10, for example, but not necessarily, at the free end of said axial band teeth 10.

In accordance with an embodiment, said geometric coupling 9 is foreseen in an extension 8 having an axial protuberance 23 that projects axially from said one or more strips 24, 25 towards said bell 3. In accordance with an embodiment, said brake band 2 has two strips 24, 25 mutually spaced by spacing elements or spacers 26 to form, between said strips 24, 25, a ventilation channel or gap 27 of the brake band 2.

In accordance with an embodiment, between said strip(s) 24 and 25 and said extension 8 for coupling the bell 3 is foreseen at least a circumferential undercut channel 28, for example arranged undercut with respect to a braking surface, and suitable for example for limiting the transmission of the deformation stresses from the strip or strips 24 and 25 to said coupling extension 8, avoiding to stress the geometric coupling 9 between brake band 2 and bell 3.

In accordance with an embodiment, said circumferential undercut channel 28 is foreseen at the radially inner periphery and facing the rotation axis X-X of said braking surface(s) 4, 5.

In accordance with an embodiment, said coupling extension 8 is joined to the strip facing the vehicle wheel, thus forming a circumferential channel 28 arranged near to the radially inner edge 6 of the brake band 2.

In accordance with an embodiment, said brake band 2 has a cylindrical braking surface 29 facing the rotation axis X-X and suitable for receiving the braking action of a braking device, for example, but not necessarily, a brake shoe device like, for example, but not necessarily, a drum-in-hat.

In accordance with an embodiment, said cylindrical braking surface 29 is foreseen in said coupling extension 8 from the brake band 2 to the bell 3.

In accordance with an embodiment, the bell 3 of the disc for disc brake 1 extends around the rotation axis X-X and has a flange 30 for connecting the bell 3 with a hub of a vehicle, preferably arranged transversally with respect to said rotation axis X-X. In accordance with an embodiment, a bell wall 31 extends from the outer edge of said flange 30, which projects from said flange 30 towards at least one coupling extension 8 of the brake band 2.

In accordance with an embodiment, said bell 2 has a portion of said wall 31 for coupling with said coupling extensions 8 of the brake band 2, forming a geometric coupling 9 with said band 2 to transmit a braking action from the band 2 to the bell 3.

In accordance with an embodiment, said geometric coupling 9 is obtained by fusion, preferably, but not necessarily, of the bell 3 on the previously obtained brake band 2 without the use of another connecting component between the band 2 and the bell 3. In accordance with an embodiment, said bell 3 is made from a second material different from the first material with which the brake band 2 is obtained, for example, but not necessarily, a second material of bell 3 having a different melting point with respect to the melting point of the material of the brake band 2, preferably, but not necessarily, a melting point of the bell lower than the melting point of the material of the brake band 2.

In accordance with an embodiment, said geometric coupling 9 has, circumferentially spaced, first axial seats 11 of the bell 3 suitable for internally receive first teeth, or a toothing 10, of the brake band 2 that extend axially.

In accordance with an embodiment, said geometric coupling 9 has, circumferentially spaced, eighth radial seats 13 that extend substantially in radial direction in said bell 3 and are in the shape of a pocket with a wall 14 that surrounds said pocket, in which said wall 14 extends substantially radially until reaching a blind pocket bottom 15. Said pockets being suitable for tightly receiving eighth teeth, or toothing 12, of the brake band 2 that extend radially, being circumferentially offset with respect to the first axial teeth 10 of the brake band 2.

In accordance with an embodiment, said eighth radial seats 13 are suitable for receiving said eighth radial toothing 12 of the brake band 2 and are arranged axially offset with respect to said first axial seats 11 suitable for receiving said first axial toothing 10 of the brake band 2.

In accordance with an embodiment, said geometric coupling 9 has a second axial toothing having, circumferentially spaced, second axial teeth 17 suitable for being tightly received in second seats 16 foreseen in the brake band 2 in the form of a pocket with a wall 18 that surrounds said seat 16 extending axially to reach a blind bottom 19.

In accordance with an embodiment, second axial bell teeth 17 are suitable for being tightly received in said second axial band seats 16 and are circumferentially aligned with said first axial seats 11 suitable for receiving said first axial band teeth 10.

In accordance with an embodiment, said second axial bell teeth 17 are suitable for being received in said second band seats 16 and are radially offset with respect to said first axial bell seats 11, suitable for receiving said first axial band teeth 10.

In accordance with an embodiment, said second bell teeth 17, suitable for being received in said second axial band seats 16, are circumferentially offset with respect to said eighth seats 13 suitable for receiving said eighth radial band toothing 12.

In accordance with an embodiment, said geometric coupling 9 has a ninth toothing having, circumferentially spaced, ninth teeth 22 suitable for being tightly received in ninth seats 20 of the brake band 2, having abutment counter-walls suitable for cooperating with abutment walls 21 according to planes that are substantially parallel and opposite, arranged in the direction substantially parallel to the radial direction R-R and suitable for transmitting circumferential actions between the brake band 2 and the bell 3.

In accordance with an embodiment, said ninth bell teeth 22 are suitable for being received in said ninth seats 20 and are foreseen circumferentially aligned with said first bell seats 11 suitable for receiving said first axial band teeth 10.

In accordance with an embodiment, said ninth bell teeth 22, for said ninth seats 20, are made projecting from said first bell seats 11 suitable for receiving said first axial band teeth 10.

In accordance with an embodiment, said bell 3 comprises a connection flange 30 with a hub of a vehicle, as well as a wall 31 that projects from said flange 30 forming, with a portion thereof, a tight geometric coupling 9 between the bell 3 and the brake band 2 obtained by co-fusion of the bell on the, for example, but not necessarily, pre-made brake band. In accordance with an embodiment, said wall 31 comprises a first surface 32 oriented towards the rotation axis X-X, and an opposite surface 33 oriented away from said rotation axis X-X.

In accordance with a general embodiment, not necessarily according to one of the preceding embodiments, a bell 3 has a bell wall 31 that projects from a connection flange 30 with a hub of a vehicle, in which said bell wall 31 comprises at least one circumferential channel 34.

This embodiment is particularly suitably for any type of a disc brake in order to limit the transmission of stresses to the connection flange 30.

In accordance with an embodiment, a disc for disc brake comprises a circumferential channel arranged at the base of the brake band near to the coupling thereof with a bell, for example, but not necessarily, undercut with respect to a braking surface, and said bell comprises at least one further circumferential channel arranged preferably, but not necessarily, near to a connection flange thereof with a hub of a vehicle.

Due to this advantageous configuration, in the case of mechanical or thermal stress of the brake band, this will be able to deform, while changing its angular position with respect to the bell wall, due to the uncoupling obtained with the circumferential channel arranged at the base of the brake band, and the possible deformation of the bell wall does not affect the angular position of the flange for connecting the bell with the hub, due to the provision of the second circumferential channel of the bell.

From the tests that have been carried out, it is shown that the provision of these two circumferential channels arranged at the base of the brake band and in the bell wall allows obtaining a considerable reduction of warping for the brake band, or deformation of the brake band outside a transversal plane with respect to the rotation axis.

In accordance with an embodiment, said at least one circumferential channel 34 foreseen in the wall 31 of the bell 3 has its opening oriented radially towards the rotation axis X-X.

In accordance with an embodiment, said at least one circumferential channel 34 has its opening radially oriented away from the rotation axis X-X.

In accordance with a rotation form, said bell wall 31 has an arched portion thereof having the first inner wall surface 32 and the second outer wall surface 33 both arched to define a wall section that embraces said at least one circumferential bell channel 34, giving a rounded or toroidal appearance to the bell wall 31.

In accordance with an embodiment, said circumferential bell channel 34 is arranged near to the end of bell wall 31 joined to said flange 30.

In accordance with an embodiment, a second circumferential channel 35 is foreseen in said bell wall 31. In accordance with an embodiment, said first circumferential channel 34 and said second circumferential channel 35 open in mutually opposite directions. In accordance with an embodiment, said first circumferential channel 34 and said second circumferential channel 35 form a section of the bell wall 31 obtained with a radial plane passing through the rotation axis X-X having a sinusoidal shape.

In accordance with an embodiment, said first circumferential channel 34 and said second circumferential channel 35 are axially offset from one another along said bell wall 31. In accordance with an embodiment, a bell wall section 31 has an outer surface 42 thereof and/or an inner surface 43 thereof having a cylindrical shape. In accordance with an embodiment, said at least one circumferential bell channel 34 or 35 is foreseen in the wall thickness of the bell wall 31, so as to reduce the radial bulk of the bell 3.

In accordance with an embodiment, said bell wall 31 has, near to said geometric coupling 9 between said band 2 and said bell 3, an annular rimming edge 36 suitable to embrace the coupling 9, for example so as to limit the radial deformation thereof during the stress of the disc.

In accordance with an embodiment, a disc for disc brake 1 comprises a brake band 2 made according to any one of the embodiments described above, and a bell according to any one of the embodiments described above.

In accordance with an embodiment, a bell 3 is fused on a pre-made brake band 2. Said bell 3 comprises a connection flange 30 with a hub and a wall 31 that projects from said flange 30 forming the tight geometric coupling 9 between the bell 3 and the brake band 2 obtained by co-fusion. In accordance with an embodiment, said wall 31 comprises a first surface oriented towards the rotation axis X-X, and an opposite second surface 33 oriented away from said rotation axis X-X. In accordance with an embodiment, said bell wall 31 comprises at least one circumferential channel 34 suitable for limiting the transmission of stress in deformation from the band 2 and/or from the wall 31 to said connection flange 30. In accordance with an embodiment, said at least one circumferential channel 34 has its opening radially oriented towards the rotation axis X-X. In accordance with an embodiment, said at least one circumferential channel 34 has its opening radially oriented away from the rotation axis X-X.

In accordance with an embodiment, a brake band has on the radially inner edge 6 thereof a substantially radial toothing that projects from said radially inner edge 6 of the brake band 2 towards the rotation axis X-X, where said radial toothing is indicated by the reference 48 in the figures.

In accordance with an embodiment, said radial toothing 48 is tightly received in seats 49 foreseen in the bell 3, for example, seats that extend in the radial direction, which are obtained by co-fusion of the bell on the band.

In accordance with an embodiment, said radial toothing 48 of the brake band 2 terminates at a cylindrical inner surface 43 of the wall 31 of the bell 3. In accordance with an embodiment, said radial toothing 48 opens radially within the bell 3, facing towards the rotation axis X-X and forming a portion cylindrically extended around said rotation axis X-X, indicated with the reference 50 in the figures.

In accordance with an embodiment, said cylindrical portion 50 has inside a surface 29 suitable for cooperating with a braking device, for example a brake shoe device, for example, but not necessarily, a drum-in-hat device.

In accordance with an embodiment, the axial extension of said cylindrical portion 50 is preferably limited so as to have an axial extension comparable to the thickness of a strip of the brake band.

In accordance with an embodiment, a method for making a disc for a disc brake 1 comprises the steps of:
  producing a brake band 2 that extends around a rotation axis X-X defining one or two strips 24, 25 having two opposite braking surface 4, 5 suitable for cooperating with pads 64 of a brake caliper arranged astride of said brake band 2.

Said method foresees the step of using, in order to produce said brake band, a first material suitable to the braking action exerted by the pads 64 on the braking surfaces 4, 5.

In accordance with an embodiment said method foresees the step of defining for said brake band an extension 8 for coupling with a bell 3.

In accordance with an embodiment, said method further foresees the step of producing said coupling extensions 8 of the brake band 2 integral or in a single piece with said brake band 2.

In accordance with an embodiment, said method foresees the step of defining for said coupling extension 8 of the brake band 2 a geometric coupling 9 with the bell 3 in order to transmit the braking action of the band 2 to the bell 3.

In accordance with an embodiment, said mezzo foresees the step of obtaining said geometric coupling 9 by fusion, preferably of the bell 3 on the brake band 2, for example, by partially putting radially said bell on top of said band, letting said bell to be radially outer, without the use of other connecting component between the band 2 and the bell 3, and making said bell from a second material different from said first material of the band 2, in which said second material of the bell 3 has a different melting point with respect to the melting point of the material of the brake band 2.

In accordance with an embodiment, said method further foresees the step of defining, for said geometric coupling, circumferentially spaced first teeth or a toothing 10 of the brake band 2 that extends axially to be tightly received in first axial seats 11 of the bell 3.

In accordance with an embodiment, said method foresees the further step of defining, for said geometric coupling 9, circumferentially spaced eighth teeth or an eighth toothing 12 of the brake band 2 that extends radially circumferentially offset with respect to said first axial teeth, said toothing 12 extending substantially radially and being suitable for being tightly received in eighth radial seats 13 present in the bell 3 and shaped like a pocket with a wall 14 that surrounds said pocket extending substantially radially up to a blind bottom 15.

In accordance with an embodiment, said bell is fused on said brake band, while remaining radially outside the brake band. In accordance with an embodiment, the bell 3 is obtained by co-fusion of aluminium on the brake band, for example previously obtained in cast iron. The provision of aluminium arranged radially outside in the shape of a circumferential ring form a pre-compression in the radial direction of the geometric coupling between bell and brake band suitable for allowing a good behaviour of the disc also at high temperatures.

In accordance with an embodiment, said method foresees the production of a brake band 2 having a geometric coupling 9 of pre-defined roughness, for example, a roughness obtainable by a fusion process, for example, but not necessarily, a sand or shell fusion. Said method further foresees the step of co-fusion on said brake band of a bell so as to obtain a micro-interpenetration of the material of the bell in the pre-defined roughness of the geometric coupling of the brake band.

In accordance with an embodiment, the apparatus for producing a brake band 2 for a disc 1 of a disc brake comprises a mould for producing a band having a cavity of mould for the band 37. Said brake band cavity 37 extends around a rotation axis X-X and has one or two cavities suitable for defining strips 24, 25 having two opposite surfaces suitable for defining braking surfaces 4, 5.

Said brake band cavity 37 is suitable for receiving a first material suitable to the braking action exerted by the pads on the braking surfaces.

Said brake band cavity 37 has at least one cavity portion suitable for defining a coupling extension 8 to a bell 3.

Preferably, but not necessarily, said cavity band portion is suitable for defining said coupling extension 8 of the brake band in communication or in a single cavity with that for defining said brake band 2.

In accordance with an embodiment, said cavity band portion defining said coupling extension 8 of the brake band 2 forms a cavity for defining a geometric coupling with a bell 3 to transmit the braking action from the band 2 to the bell 3.

In accordance with an embodiment, said cavity for defining said geometric coupling 9 is suitable for obtaining the geometric coupling 9 by fusion, preferably of the bell 3 on the pre-defined brake band 2 without the use of another connecting component between said band and said bell.

In accordance with an embodiment, said cavity for defining said geometric coupling 9 has circumferentially spaced first cavities for defining first teeth or a toothing 10 of the band 2 that extends axially to be tightly received in first axial seats of the bell 3.

In accordance with an embodiment, said cavity for defining said geometric coupling 9 has circumferentially spaced cavities for eighth teeth or a toothing 12 of the band that extends radially and is circumferentially offset with respect to said first axial teeth 10 and said toothing 12 extending substantially radially and being suitable for being tightly received in eighth radial seats 13 present in the bell 3 and shaped like a pocket with a wall 14 that surrounds said pocket extending substantially radially up to a blind bottom 15.

In accordance with an embodiment, an apparatus for producing a disc 1 comprises a first half-mould 38 suitable for cooperating with a second half-mould 39 to receive within a disc mould cavity 41 a pre-made brake band and define, with said brake band and said walls of said cavity 41, a residual space for the fusion or co-fusion on said band of a bell, in which said band is made according to any one of the embodiment described above, and said residual cavity is suitable for producing a bell as defined in any one of the embodiments described above.

In accordance with an embodiment, said apparatus also comprises trolleys 40 suitable for radially moving in said residual cavity 41 in order to define said residual space in order to obtain the fusion or co-fusion on said band of a bell, as defined in any one of the embodiments described above, for example, four axially slidable trolleys to define the bell outer surface.

Thanks to the embodiments described above, it is possible to obtain a disc for a disc brake that is able to transmit the torque between the brake band and the bell by a shape coupling, preferably obtained by co-fusion of the bell on a pre-made brake band.

The geometric coupling if particularly efficient during the braking action also under abrupt and repeated braking actions, which cause elevate and repeated thermal stresses, also due to the provision of a circumferential channel obtained in the bell body.

Preferably, the provision of a bell in materials that are lighter than the materials of the band allows obtaining a considerable reduction of the weights of the disc for disc brake.

The geometric coupling described above allows exploiting to the maximum the characteristics of the material of the bell, for example, aluminium that shrinks during its transition from the liquid to the solid state. Therefore, thanks to the provision of the arrangement of the bell outside with respect to the coupling portion of the brake band, the aluminium of the bell embrace by shrinking the ring the material of the brake band, for example, cast iron, evenly filling all the interspaces, and naturally holding to the coupling portion of the band, which is purposely maintained rough.

The shape of the geometric coupling ha been suitably designed so that the aluminium of the bell tightly fits in the shape of the coupling and firmly locks the coupling between the band and the bell in all directions.

Form the test that have been hereto carried out, it is shown that the geometrical shape of the proposed coupling between the band and the bell allows thermally insulating the material of the bell, for example, aluminium, from material of the brake band, for example, cast iron.

The proposed coupling has further shown a particular elasticity, which further allows compensating the stresses transmitted by the braking actions.

The shape of the proposed geometric coupling has shown to have the greater contact surface between the brake band and the bell, suitable for transmitting a higher braking torque value, therefore allowing the use of the so-obtained braking disc obtained for any type of braking condition.

The proposed geometric coupling has slots and teeth oriented according to the axial direction, radial and tangential, or circumferential, allowing, with le cave oriented in the axial and radial direction, the transmission of the braking torque, and, with the slots oriented in the tangential direction, to maintain the axial constraint between the band and the bell.

Notwithstanding the complex geometry of the geometric coupling between the band and the bell, the proposed shape is easy to produce.

Furthermore, the arrangement of the bell particularly in aluminium on an outermost diameter with respect to that of the geometric coupling portion of the brake band, for example, in cast iron, allows a good contact between the two components in any operative conditions, even when the operative temperature changes.

The co-fusion of the aluminium on the cast iron allows having an excellent coupling between the bell and the brake band also in the case of a complex geometry, such as the one that has been proposed, further generating a pre-compression in the radial direction, which allows a good behaviour of the disc at different temperatures.

The geometry of the drag or coupling area allows an easy closure of the shell or half-moulds for the co-fusion of the bell on the pre-made band, limiting the number of machining operation that are needed to obtain the disc for disc brake.

It should be apparent that those skilled in the art, with the aim of meeting specific, contingent needs, will be able to make a number of modifications and variations to the disc for disc brake according to the invention, in any case all being within the protection scope of the invention as defined by the following claims.

| REFERENCES | |
|---|---|
| 1 | disc |
| 2 | brake band |
| 3 | bell |
| 4 | opposite braking surface |
| 5 | opposite braking surface |
| 6 | radially inner edge of the band |
| 7 | radially outer edge of the band |
| 8 | coupling extension with the bell |
| 9 | geometric coupling |
| 10 | first axial band teeth |
| 11 | first axial seats of the bell |
| 12 | eighth radial teeth of the band |
| 13 | eighth blind pocket-shaped radial seats of the bell |
| 14 | side wall of eighth seat of the bell |
| 15 | bottom of eighth seat of the bell |
| 16 | pocket-shaped seat of the second axial toothing of the band |
| 17 | second tooth of the second axial toothing of the bell |
| 18 | Wall of the second band seat |
| 19 | blind bottom of the second band seat |
| 20 | ninth band seats |
| 21 | abutment walls to transmit circumferential actions |
| 22 | teeth of the ninth toothing of the bell |
| 23 | axial band protuberance in which there is the geometric coupling |
| 24 | first band strip |
| 25 | second band strip |
| 26 | spacers of strips |
| 27 | ventilation band channel |
| 28 | undercut channel at the base of the strips |
| 29 | surface for drum-in-hat |
| 30 | bell flange |
| 31 | bell wall |
| 32 | first radially inner surface of bell wall |
| 33 | second radial outer surface of the bell wall |
| 34 | circumferential bell channel |
| 35 | second circumferential bell channel |
| 36 | annular rimming edge of the bell |
| 37 | cavity of brake band |
| 38 | half-mould of the disc |
| 39 | second half-mould of the disc |
| 40 | trolleys |

| REFERENCES | |
|---|---|
| 41 | mould cavity for disc |
| 42 | outer surface of the cylindrical portion of the wall |
| 43 | inner surface of the cylindrical portion of the wall |
| 44 | |
| 45 | |
| 46 | |
| 47 | |
| 48 | radial toothing |
| 49 | seats for radial toothing |
| 50 | cylindrical band portion |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | pads |
| X-X | rotation axis |
| A-A | axial direction |
| R-R | radial direction |
| T-T | circumferential direction |
| RE | radial outer direction |
| RI | radial inner direction |

The invention claimed is:

1. A brake band for a disc of a disc brake, wherein:
said brake band extends around a rotation axis (X-X); and
said brake band defines an axial direction (A-A) parallel to said rotation axis (X-X), a radial direction (R-R) that defines a radially outward direction (RE) when going away from said rotation axis (X-X), as well as a radially inward direction (RI) when approaching said rotation axis (X-X), as well as a circumferential direction (T-T) perpendicular to said axial direction (A-A) and said radial direction (R-R);
said brake band is made from a first material configured for receiving a braking action exerted by pads on first and second braking surfaces of said brake band;
said brake band has at least one coupling extension configured for coupling with a bell;
said coupling extension of the brake band is integrally formed with said brake band;
said coupling extension of the brake band forms a geometric coupling;
said coupling extension comprises:
circumferentially spaced, axial teeth that extend axially from the coupling extension; and
circumferentially spaced radial teeth that extend radially outwardly from the coupling extension and are circumferentially offset with respect to said axial teeth.

2. A brake band according to claim 1, wherein:
said brake band has a first plate and a second plate, said first plate comprising said first braking surface and said second plate comprising said second braking surface, said braking surfaces being configured for cooperating with pads of a brake caliper disposed astride said brake band;

said brake band has a radially inner edge facing said rotation axis (X-X) and a radially outer edge facing away from said rotation axis (X-X); and said radial teeth are axially offset with respect to said axial teeth.

3. A brake band according to claim 1, wherein:

said coupling extension defines circumferentially spaced, axial band seats, each of said axial band seats having abutment walls that lie within planes that are substantially parallel to each other and are disposed opposite each other in the direction substantially parallel to the radial direction (R-R);

said axial band seats are circumferentially aligned with said axial teeth; and said axial band seats are disposed on said axial teeth.

4. A brake band according to claim 1, wherein said coupling extension has an axial protuberance that projects axially from a first plate, said first plate comprising said first braking surface.

5. A brake band according to claim 1, wherein:

said brake band comprises a first plate comprising said first braking surface and a second plate comprising said second braking surface, between said first and second plates and said coupling extension, said brake band defines at least one circumferential undercut channel, said undercut channel being undercut with respect to said first plate, said undercut channel configured for limiting the transmission of deformation stresses from at least one of the first and second plates to said coupling extension, and said undercut channel is defined at a radially inner periphery of the first plate and an opening of said undercut channel faces the axial direction.

6. A brake band according to claim 1, wherein:

said brake band has a cylindrical braking surface facing the rotation axis (X-X) and is configured for receiving the braking action of a brake shoe device; and said cylindrical braking surface is defined by said coupling extension.

7. A brake band according to claim 3, wherein:

said axial teeth comprise first axial teeth and said axial band seats comprise first axial band seats, said coupling extension further defines second axial band seats that are circumferentially spaced and extend axially into the coupling extension, each of said second axial band seats having an axial seat wall and an axial seat blind bottom that form an axial seat pocket, said second axial band seats are circumferentially aligned with said first axial teeth, and said second axial band seats are radially offset with respect to said first axial teeth and are circumferentially offset with respect to said radial teeth.

8. A bell for a disc of a disc brake, wherein said bell extends around a rotation axis (X-X) for the disc, said bell comprising:

a flange configured for connecting the bell to a hub of a vehicle; and a bell wall;

wherein:

said bell defines an axial direction (A-A) parallel to said rotation axis (X-X), a radial direction (R-R) that defines a radially outward direction (RE) when going away from said rotation axis (X-X), as well as a radially inward direction (RI) when approaching said rotation axis (X-X), as well as a circumferential direction (T-T) perpendicular to said axial direction (A-A) and said radial direction (R-R);

said bell wall comprises a portion configured for coupling with a coupling extension of a brake band, and said portion of said bell wall defines:

circumferentially spaced, axial seats; and circumferentially spaced radial seats that extend substantially radially outwardly into said portion of said bell wall, each of said radial seats comprising a radial seat wall and a radial seat blind bottom that define a radial seat pocket that extends substantially radially outwardly into said portion of said bell wall.

9. A bell according to claim 8, wherein:

said radial seats are axially offset with respect to said axial seats, said portion of said bell wall further comprises axial teeth extending axially from the portion of the bell wall, the axial teeth being circumferentially spaced, said axial teeth are circumferentially aligned with said axial seats, said axial teeth are radially offset with respect to said axial seats, and said axial teeth are circumferentially offset with respect to said radial seats.

10. A bell according to claim 8, wherein:

said bell wall comprises an inner wall surface oriented towards the rotation axis (X-X) and an opposite outer wall surface oriented away from said rotation axis (X-X);

said bell wall defines at least one circumferential channel configured for limiting the transmission of deformation stresses from the bell wall to said flange;

said bell wall defines an arched portion between the inner wall surface and the outer wall surface, the arched portion having the same curvature as said at least one circumferential channel such that a portion of the bell wall looks rounded or toroidal.

11. A bell according to claim 10, wherein:

said at least one circumferential channel comprises a first circumferential channel and a second circumferential channel, said first circumferential channel and said second circumferential channel open in opposite radial directions, said first circumferential channel and said second circumferential channel form a section of the bell wall having a sinusoidal shape as viewed from a cross-section taken through a radial plane extending through the rotation axis, said first circumferential channel and said second circumferential channel are axially offset from one another along said bell wall, and at least one of said first and second circumferential bell channels are defined in the bell wall so as to reduce a radial bulk of the bell.

12. A bell according to claim 8, wherein:

said portion of said bell wall further comprises circumferentially spaced, axial bell teeth, said axial bell teeth having abutment counter-walls, the abutment counter-walls lying within planes that are substantially parallel to each other and are disposed opposite each other in the direction substantially parallel to the radial direction (R-R), said axial bell teeth are circumferentially aligned with said axial seats, and said axial bell teeth project from said axial seats.

13. A bell according to claim 8, wherein:
said bell wall, adjacent said portion of said bell wall, has an annular rimming edge, said rimming edge configured for limiting the radial deformation of said geometric coupling, and
the annular rimming edge is oriented so as to radially face away from the rotation axis (X-X).

14. A disc for a disc brake, the disc comprising a brake band and a bell, wherein:
the brake band and the bell extend around a rotation axis (X-X) for the disc, and
said brake band and said disc define an axial direction (A-A) parallel to said rotation axis (X-X), a radial direction (R-R) that defines a radially outward direction (RE) when going away from said rotation axis (X-X), as well as a radially inward direction (RI) when approaching said rotation axis (X-X), as well as a circumferential direction (T-T) perpendicular to said axial direction (A-A) and said radial direction (R-R),
said brake band is made from a first material configured for receiving a braking action exerted by pads on first and second braking surfaces of said brake band,
said brake band has at least one coupling extension configured for coupling with said bell, said bell being configured for coupling the disc with a hub of a vehicle,
said coupling extension of the brake band is integrally formed with said brake band,
a geometric coupling between said brake band and said bell comprises said coupling extension of the brake band and at least a portion of a bell wall of said bell, said geometric coupling configured to transmit the braking action from the brake band to the bell,
said geometric coupling is obtained by molding the bell on the brake band without the use of another connecting component between said brake band and said bell, said bell being made from a second material different from said first material of the brake band, and said second material of said bell having a different melting point with respect to a melting point of said first material of said brake band,
said bell comprises:
a flange configured for connecting the bell to the hub of the vehicle; and
said bell wall that from said flange projects towards said at least one coupling extension of said brake band, and
said geometric coupling comprises:
circumferentially spaced axial teeth that extend axially from the brake band coupling extension;
circumferentially spaced axial seats defined by the portion of the bell wall, the axial seats extending axially into the portion of the bell wall and being configured for tightly receiving the axial teeth of the coupling extension;
circumferentially spaced radial teeth that extend radially outwardly from the coupling extension and are circumferentially offset with respect to said axial teeth; and
circumferentially spaced radial seats defined by the portion of the bell wall, the radial seats extending radially outwardly into the portion of the bell wall and being configured for tightly receiving the radial teeth of the coupling extension, each radial seat being defined by a radial seat wall and a radial seat blind bottom that define a radial seat pocket extending substantially radially into the portion of the bell wall.

15. A disc according to claim 14, said bell wall comprising an inner wall surface oriented towards the rotation axis (X-X) and an opposite outer wall surface oriented away from said rotation axis (X-X).

16. A disc according to claim 14, wherein:
said bell wall defines at least one circumferential channel configured for limiting the transmission of deformation stresses from the brake band and the bell wall to said flange, and
said at least one circumferential channel opens radially towards the rotation axis (X-X).

17. A disc according to claim 16, wherein:
said bell wall defines an arched portion, the arched portion being radially aligned with said at least one circumferential channel such that the bell wall looks rounded or toroidal, and
said circumferential channel is defined adjacent an end of said bell wall that is adjacent said flange.

18. A disc according to claim 17, wherein:
the at least one circumferential channel opening radially toward said rotation axis comprises a first circumferential channel,
said bell wall further defines a second circumferential channel, said second circumferential channel opening in an opposite radial direction than said first circumferential channel,
said first circumferential channel and said second circumferential channel form a section of the bell wall having a sinusoidal shape as viewed from a cross section taken through a radial plane extending through said rotation axis,
said first circumferential channel and said second circumferential channel are axially offset from one another along said bell wall,
said bell wall has cylindrical outer wall and inner wall surfaces, and
said first and second circumferential bell channels are configured to reduce the radial bulk of the bell.

19. A disc according to claim 14, wherein:
said bell wall comprises at least one circumferential channel configured for limiting the transmission of deformation stresses from the brake band and the bell wall to said flange, and
said at least one circumferential channel opens radially away from the rotation axis (X-X).

20. A disc according to claim 14, wherein:
said bell wall adjacent said geometric coupling between said brake band and said bell has an annular rimming edge configured for limiting the radial deformation of said geometric coupling; and
said coupling extension of said brake band is oriented so as to face towards the rotation axis (X-X) and the bell wall is oriented so as to face away from the rotation axis (X-X).

* * * * *